(12) United States Patent
Harman et al.

(10) Patent No.: US 6,606,444 B2
(45) Date of Patent: Aug. 12, 2003

(54) POSITIONING DEVICE ESPECIALLY FOR ASSEMBLING OPTICAL COMPONENTS

(76) Inventors: Murray R. Harman, 90 Ashpark Crescent, Ottawa, Ontario, K1T 3N7 (CA); Stephen G. Harman, 5 Ashgrove Crescent, Ottawa, Ontario, K2G 0S2 (CA)

(*) Notice: Subject to any disclaimer, the term of this patent is extended or adjusted under 35 U.S.C. 154(b) by 0 days.

(21) Appl. No.: 10/179,945

(22) Filed: Jun. 26, 2002

(65) Prior Publication Data

US 2002/0176683 A1 Nov. 28, 2002

Related U.S. Application Data

(63) Continuation-in-part of application No. 09/671,143, filed on Sep. 28, 2000, now Pat. No. 6,498,892.

(51) Int. Cl.[7] .............................................. G02B 6/38
(52) U.S. Cl. .................................... 385/137; 385/136
(58) Field of Search ................................. 385/137, 136, 385/140, 134

(56) References Cited

U.S. PATENT DOCUMENTS

| | | | |
|---|---|---|---|
| 4,686,440 A | 8/1987 | Hatamura et al. | 318/646 |
| 4,888,878 A | 12/1989 | Nagasawa et al. | 33/573 |
| 4,920,660 A | 5/1990 | Nagasawa et al. | 33/568 |
| 4,991,309 A | 2/1991 | Nagasawa et al. | 33/568 |
| 5,005,298 A | 4/1991 | Nagasawa et al. | 33/573 |
| 5,051,594 A | 9/1991 | Tsuda et al. | 250/442.1 |
| 6,193,226 B1 | 2/2001 | Davies | 269/71 |
| 6,498,892 B1 * | 12/2002 | Harman | 385/137 |

* cited by examiner

Primary Examiner—Hung Dang
(74) Attorney, Agent, or Firm—David J. French

(57) ABSTRACT

A positioning device suitable for accurately positioning objects such as optical fibers includes a first support, a movable support restrained for movement relative to the first support with one degree of freedom and carrying a holder for the object to be positioned, and an intermediate support which is connected to the first support by a pair of first spaced flexible elements of equal length and which is connected to the movable support by a pair of second spaced flexible elements, the second pair also being equal in length to each other. The first and second flexible elements are oppositely arranged and dimensioned so that arc-errors in the movement of the intermediate support caused by bending of the first flexible elements are substantially compensated by arc movements of the second flexible elements to produce a desired movement of the movable support, which may be rectilinear or angular movement about an axis. An actuator causes movement of the movable support with bending of all the flexible elements, and a control member connects the first support, the intermediate support and the movable support so that the degree of movement of the intermediate support is one half the movement of the movable support.

30 Claims, 14 Drawing Sheets

POSITIONING DEVICE ESPECIALLY FOR ASSEMBLING OPTICAL COMPONENTS

CROSS-REFERENCE TO RELATED APPLICATION

This application is a continuation-in-part of U.S. Ser. No. 09/671,143, filed Sept. 28, 2000, now U.S. Pat. No. 6,498,892, in the name of Murray R. Harman.

BACKGROUND OF THE INVENTION

1. Field of the Invention

In assembling micro-optic structures and in particular those utilizing fiber optic waveguides, it is often necessary to control relative spatial alignments with extremely fine precision. Some optical components use optical fibers having a core region that carries a beam of light that is of the order of 10 microns in diameter (and even smaller in some cases). In order to assemble such a component the optical fibers have to be manipulated with a precision level on the order of $1/10^{th}$ of a micron.

2. Prior Art

In the past, optical fiber components have been assembled using known 3-axis ball-bearing positioners. Anyone who has attempted to achieve stable alignment using single-mode optical fiber with such known kinds of positioners equipped with micrometer actuators will attest to the lack of required precision. Crossed roller and ball type stages inherently require preload which generates motional friction and have a resolution limit set by the randomness of the required drive force due to dust and surface variations associated with the frictional interfaces and the limited stiffness of actuator mechanisms.

Other designs of positioners offer frictionless movement with the use of flexure-based designs but often at the expense of overall mechanical stiffness. A single parallel cantilever pair will generate an arc-error in its trajectory. What is commonly done is to combine two cantilever pairs into a compound cantilever stage so as to have one compensate the other and provide perfect linear motion. Compound cantilever stages are very large for their available travel as conventional designs consist of two separate compound stages that are effectively joined at a centerline to maintain high off-axis stiffness. An example of such a positioner mechanism is shown in U.S. Pat. No. 4,686,440, issued Aug. 11, 1987 to Hatamura et al., in FIGS. 12 and 13. One of the objects of this invention is to provide a compound cantilever stage that is much smaller than the conventional design.

The majority of 3-axis positioning equipment is made up by staging single axis units one on top of each other using angle plates. This results in a structure that has diminished resolution and stiffness as one moves progressively further from the mounting frame of reference. In many designs the stiffness of the overall unit is inadequate to resist the forces required to operate the actuators. In these cases the operator must use a touch and release method where the signal is adjusted and the operator then has to release the actuator to witness the result. Another downfall of a 3-axis positioner made up of three individual orthogonally arranged stages is the fact that the actuators are also arranged in an XYZ configuration, i.e. each has an axis perpendicular to the other two actuators, making prolonged use strenuous due to the required hand movements.

An inherent limitation to the resolution of nearly all positioning systems lies in the use of what can be termed simple axial actuators. A micrometer head or a complex piezo micrometer head are examples of simple actuators as they produce a displacement that is used to control the movement of a translation stage in a direct ratio. For example, a 1 micron movement of the shaft of said actuator is used to produce a 1 micron movement of the corresponding translation stage. As a result all motional errors such as hysteresis or randomness of movement inherent in the actuator itself are passed on directly to the translation stage. The requirement for sub-micron resolution also necessitates the requirement for differential micrometer stages and stepper-motor driven lead screw drives in order to achieve the necessary resolution since a single thread micrometer under hand control cannot be easily adjusted at such fine a resolution. The general trend towards increased resolution and stability in positioning equipment has been driven by the increased use of small-core single-mode optical fibers over the larger core multimode optical fibers which require less precision in alignment manipulation. In order to remove the effect of operator induced forces a number of sub-micron resolution remote driven motor driven stages have emerged on the market. Even with fully automated positioning systems where a scan routine is carried out under computer control, some level of operator intervention is required for handling and loading the individual elements to be assembled. In many labor intensive assembly applications the cost of an automated system cannot be justified and would not be considered if an appropriate mechanical positioner were available.

Copending U.S. patent application No.671,143 as aforesaid, which is hereby incorporated by reference, describes and claims a 3-axis positioning device ideally suited for, but not limited to, the assembly of single-mode fiber optic components. The invention of this earlier application allows for all of the actuators to be placed in a common orientation to reduce hand fatigue and improve adjustment efficiency. That invention teaches a structure that provides for both coarse and fine movement while using a simple adjustment screw and a single micrometer head for each of at least two axes of movement. The structure also allows for the fine movement control to be a fraction of the travel of the micrometer head while increasing movement resolution. Another aspect of the invention of this earlier application includes means of translating motion from one axis of movement to another. In addition that invention teaches a linear compound flexure stage that provides for large travel and perfect linear motion with high stiffniess. In its ideal form that invention can provide for operator insensitive adjustment when aligning single-mode optical fibers with a resolution limit that is comparable to a closed-loop piezo driven translation stage.

The invention of the aforesaid copending application is a significant improvement over a conventional stacked 3-axis unit as the operator adjustment forces act only on a single stiff linear translation stage instead of the sum of the total of all stages. It is then possible to realize a positioning device that can operate under hand control at resolution and stiffness levels required for single-mode fiber optic alignments wherein the operator does not influence the measured optical signal level during adjustment of the unit. It is also possible with that invention to implement linear motor drive on the second and third axes without affecting the overall sensitivity to hand adjustment forces.

Another aspect of the aforesaid copending application is an orthogonal drive conversion system which serves to isolate the holding means of a positioner from manual forces applied to it. Another advantage of this orthogonal drive conversion is that it allows micrometer type actuators to be all aligned in one direction, thus decreasing operator strain.

Yet another aspect of the positioner of the aforesaid copending application is a compound cantilever stage that is one-half of the conventional design; the latter being a design which uses two separate compound stages that are effectively joined at a centerline to maintain high off-axis stiffness. Traditionally the one half arrangement is not used as the intermediate frame of reference would move in response to external loads placed on the system and limit off-axis stiffness. It can be shown however, that if the intermediate frame in a compound cantilever stage were to be forced to move one-half of the overall displacement, then high stiffness can be achieved while requiring only one half of the conventional compound cantilever design. An aspect of this earlier invention was to provide a forcing or control means to set the displacement of the intermediate frame of reference of a compound cantilever stage to one half of the output displacement. In its preferred form said control means is a beam connected to the parts by frictionless elastic elements.

SUMMARY OF THE INVENTION

In the copending application the compound cantilever stage was claimed in relation to rectilinear movement; since that application was concerned with a 3-axis positioner, only rectilinear motion was required.

However, the present invention is concerned with a positioner having a mechanism capable of angular movements, and which mechanism can be combined with the mechanism of the copending application to make a positioner which moves an object such as an optical fiber with four, five or six degrees of freedom. The preferred form of the positioner has mechanism similar to that of the copending application for providing rectilinear motion in X, Y and Z axes; and in addition provides structure mounted on the movable support of the earlier positioner and which provides angular movement about one or more of the same three axes. Where angular motion is about two or three axes, these are preferably coincident. These angular adjustments are achieved, as are the rectilinear movements of the earlier stages, by use of flexures which eliminate friction and play or looseness of joints. It has been found that a compound cantilever stage somewhat similar in principle to that used for rectilinear movement in the three stage positioner can also be used to connect stages which move angularly relative to each other.

In accordance with this aspect of the invention, a positioning device includes:

a first support;

a movable support restrained for movement relative to said first support with one degree of freedom and carrying holding means for an object to be positioned;

an intermediate support which is connected to said first support by a pair of first spaced flexible elements of substantially equal length and which is connected to the movable support by a pair of second spaced flexible elements also of substantially equal length, said first and second flexible elements being oppositely arranged and being dimensioned so that arc errors in the movement of the intermediate support caused by bending of said first flexible elements are substantially compensated by arc movements of said second flexible elements to produce a desired movement of the movable support, an actuator connected to cause movement of the movable support relative to the first support with bending of said flexible elements; and control means connecting said first support, said intermediate support and the movable support so that the degree of movement of the intermediate support is one half that of the movable support.

The reference to the movable support "carrying holding means" is not limited to the case where holding means are directly mounted on the movable support; it includes an indirect mounting on the movable support via further adjustment stages.

Although in the preferred embodiments the flexible elements of each first or second pair are equal in length to each other, reasonable accuracy is possible with differences in these lengths of 5 or 10%.

Where, as in the copending application, the desired movement of the movable support is rectilinear, then all of the first and second flexible elements are of the same length, and preferably of the same stiffness. Slight differences in stiffness are however not of concern, due to the presence of the control means.

Where the desired movement of the movable support is angular motion about a fixed axis, then the first and second flexible elements may be radial elements all having the same radial dimensions, i.e. having the same inner and outer radii, and again preferably having the same stiffness. However, in the case of angular motion, other arrangements are possible, and for example the second flexible elements may be displaced radially outwardly relative to the first such elements, with the second elements also having greater radial length than the first elements.

As in the copending application, the control means may be a rigid member connected by further flexible elements to the first support, the intermediate support, and the movable support. Also, as before, in the case of rectilinear movement of the movable support and intermediate support, the control means is preferably a rigid member connected to the intermediate support at a position midway between its connections to the first support and the movable support, so as to ensure that the movement of the intermediate support relative to said first support is one-half that of the movable support.

As indicated, the movable support may have angular motion about an axis, in which case the "degree of movement" of the intermediate support will be one-half the angle of movement of the movable support. In this case the flexible elements extend radially with respect to said axis when the movable support is in one position within its range of movement, and the control means is a rigid member connected to the intermediate support at a position chosen such that the angular movement of the intermediate support relative to the first support is the desired one half that of the movable support. The rigid member is preferably connected to the first support, the intermediate support, and the movable support by flexible elements connected to these parts at points which lie on a line extending radially with respect to the said stationary axis.

The aforesaid copending U.S. application described, with reference to FIGS. 5 to 11, control mechanisms for controlling movements in the X and Y directions by means of actuators mounted on a mounting plate held by the first, or Z axis, rectilinear stage and which were both parallel to the Z direction actuator. These mechanisms, which are also used in the preferred embodiment of the present positioner for the X and Y stages, are convenient for the operator and prevent hand forces undesirably affecting the X and Y adjustments. In a 6 axis positioner in accordance with of the present invention it is desirable that the three angular position actuators also be mounted on the first or Z axis stage and be parallel to the other actuators. However this requires somewhat complex linkage to ensure that there is little or no cross-coupling between the either the X and Y translational movements and the angular adjustments, nor between the first or second stage angular adjustments and the later stage angular adjustments. In other words it is required that later angular adjustment stages can be controlled by mechanisms isolated from movements in the earlier stages.

To take a simple case, it is required that where a positioning device has a first support and a second support connected to the first support by means allowing lateral movement of the second support relative to the first support in the X axis direction, for example, and where a third support is mounted for angular movement on the second support about a pivot axis, the actuating means for causing angular movement of the third support relative to the second support should operate while being substantially unaffected by movement of the second support at least in the X direction.

In accordance with this further feature of the present invention, the actuating means for this situation includes an axially movable control link extending in a direction generally perpendicular to the X axis and having an inner end arranged to be moved axially relative to the first support by an actuator mounted on the first support, the control link being flexibly connected at its inner and outer ends respectively to the first and second supports, the control link having its outer end connected to a control mechanism mounted on the second support, and in which the control mechanism includes:

a) restraining means for causing the outer end of the control link to move laterally with the second support in the direction of the X axis while allowing said outer end to move axially relative to said second support, and b) motion conversion means for converting axial movement of the control link outer end relative to said second support into movement of a moment arm part of the third support so as to cause angular movement of said third support relative to the second support about the pivot axis.

The control mechanism is such that if lateral movement of the second support relative to the first support occurs in the X axis direction without axial movement of the inner end of the control link relative to the first support, the moment arm part remains substantially stationary relative to the second support.

The reference above to the X direction is of course arbitrary; the same considerations apply if motion of a second support relative to a first support occurs in the Y direction.

Where this mechanism is applied to the first angularly movable stage which is mounted on the third or last stage of the linear 3 axis positioner, the control mechanism has to take into account that the first and second supports as defined in the preceding paragraphs, which here would be the first and third stages of the 3 axis positioner, are connected primarily by flexible elements providing parallel linkages so that when the second support moves in either the X or Y direction, movements of points on the second support relative to the first support occur in arcs having equal radii determined by the effective lengths of the flexible elements. In this case the control link preferably has an effective length equal to the effective lengths of these flexible elements, which are themselves of equal length for the X and Y movements, so that the control link swings in unison with the flexible elements and so that movements of the second support in the X or Y directions do not change the relationship between the outer end of the control link and the second support.

The motion conversion means may include a bell crank having an inner end connected to the outer end of the control link, with an outer end of the bell crank being arranged to transmit force to said moment arm part. Pivotal movement of the bell crank is isolated from movement of the second support relative to the first support in the X direction, or in the Y direction if the latter movement is present.

Where a bell crank is used, this may be pivotally mounted on a fulcrum fixed to the second support.

Alternatively, the bell crank may be indirectly mounted on the second support, and may have a first arm connected both to the outer end of the control link and to a second link also connected to the first support, with the control and second links forming a first parallelogram linkage, a second arm of the bell crank being connected to the second support by third and fourth links forming a second parallelogram linkage operating perpendicularly to the first. With this arrangement, the rotational position of the bell crank relative to the second support is isolated from movements of said second support relative to the first support both in the X direction and in directions off-set or perpendicular to the X direction. This is particularly useful for the second or yaw stage of angular movement, which is mounted on the roll stage, since the roll stage moves not only with the swinging movements provided by the flexible elements connecting the Y and X movement stages, but also has circumferential movement about the axis of the roll stage which is slightly off-set from the swinging motion which characterizes the usual X direction.

The manner in which movement is transmitted from the actuators to the inner end of the control link may be similar to the mechanism used in the three axis positioner of the aforesaid copending application, in that the inner end of the control link may be held by a lever member located at one end by fulcrum means and at its other end by the respective actuator. Also, the fulcrum means may include an adjustment screw arranged to provide movement of the lever independent of the movement of the actuator.

A further feature of this invention relates to magnetic means used to reduce the forces needed to move the positioner parts against the restraining forces of the various flexible elements.

In positioning devices using flexible elements in place of bearings or sliding joints, there are conventionally trade-offs between having sufficient ease of movement, on the one hand, and having, on the other hand, sufficient rigidity to ensure accuracy of movement. Another aspect of the present invention is the provision of magnetic means to counteract stiffness of flexible elements without reducing accuracy of movement.

In accordance with this aspect of the invention, in a positioning device including:

a first support;

a second support movably mounted on said first support and constrained to move relative thereto with one degree of freedom, said second support carrying holding means for an object to be positioned;

and at least one pair of resilient, flexible elements connecting said first and second supports and capable of flexing in response to movements of the second support relative to the first support to provide a restoring force when displaced from an initial position at which the restoring force is a minimum, there are provided magnetic means acting between said supports, said magnetic means being positioned to counteract said restoring force when the second support is moved from said initial position, whereby the force required to move the second support against said restoring force is reduced by magnetic forces produced by said magnetic means.

The magnetic means may only partially counteract the restoring spring forces of the flexure elements, so that the second support would still tend to move to a stable central position in the absence of any actuator, as it would without the magnetic means. While the magnets may counteract all of the spring forces, the arrangements of this invention differ from known bistable mechanisms using magnets in which the magnets overcome the restoring forces and cause the mechanism to move between opposed end positions, in that here the magnetic surfaces do not contact each other and do not normally apply very strong forces which would hold the parts in extreme positions.

The magnetic means may include magnets having axes aligned obliquely to a direction of relative movement between the one support and the second support, these magnets being arranged so that the amount of relative movement between said latter parts may be greater than the maximum gap between said magnets.

Where the magnets are aligned obliquely in this manner, they may be provided symmetrically about an axis which is parallel to the direction of movement, so that the net forces provided by the magnets are solely in the direction of said movement. Additionally, the magnets may also be arranged symmetrically about an axis which is perpendicular to the direction of movement, the magnets being all aligned with sides of a rhombus.

Alternatively, the magnetic means may include magnets located respectively on said one support and on the second support and positioned so that like poles of said magnets lie directly opposite to each other when the movable support is in its initial position.

The magnetic means may include two or more pairs of magnets. Where two pairs of magnets are used, one pair may have opposed north poles and one pair may have opposed south poles, the two pairs being close enough that when the second support has been displaced from its initial position the north pole of one magnet on the second support may be attracted to the south pole of a magnet on the first support so that there are attractive as well as repulsive forces assisting in counteracting the forces in the flexible elements. Where three pairs of magnets are used, one magnet of each pair being on the first support and the other magnet of each pair being on the second support, the pairs of magnets may include a central pair having opposed poles of a first polarity and which lie directly opposite each other when the second support is in its initial position, and two outer pairs of magnets having opposed poles of a second polarity which also lie directly opposite each other when the second support is in said initial position, said magnets being positioned so that a magnet of the central pair is attracted to a magnet of an outer pair on movement of the second support from its initial position.

BRIEF DESCRIPTION OF THE DRAWINGS

Preferred embodiments of the invention will now be described with reference to the accompanying drawings, in which.

DESCRIPTION OF THE PREFERRED EMBODIMENT

A. Three Axis Positioner; Addition of Magnetic Means

Figure 1:
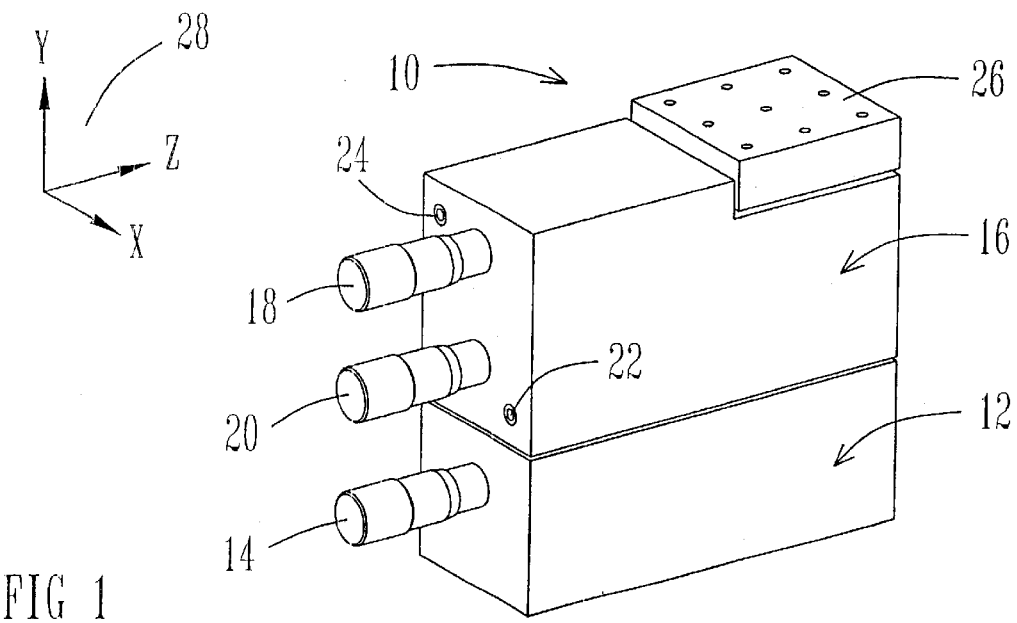
FIG. 1 shows a perspective view of a 3-Axis XYZ positioner similar to that of the invention of the aforesaid copending application, and which forms part of the positioner of the present invention.

The 3-axis positioning device of the aforesaid copending application, which forms the basis for parts added in accordance with the present invention, is shown in block form in FIG. 1 and is indicated by the number 10 in the drawings. As can be seen, all of the micrometer type actuators 14, 18, 20 are oriented parallel to a common axis which simplifies adjustment and reduces operator hand fatigue. It is also possible to arrange the micrometers on or about a common centerline which eliminates the need for manufacturing a left and right version of the invention as is the common practice with conventional 3-axis designs. In its entire form, the 3-axis positioner consists of two portions. Firstly, a lower portion has a linear translation stage 12 that is controlled by an actuator 14 to move in the Z direction of the axis designator 28, and secondly a top portion 16 is affixed atop the linear translation stage 12. Two actuators 18, 20 allow for fine movement control at a drive ratio reduced by a lever mechanism described in my copending application, and two adjustment screws 22, 24 provide coarse adjustment capability. In the invention as described in the copending application the actuator 18 and adjustment screw 22 in conduction with a series of internal elements generate a relative movement at the mounting plate 26 in the Y (vertical) direction as defined by the axis designator 28. This mechanism is further described below with reference to FIG. 9 of this application. The other actuator 20 and adjustment screw 24 generate a relative movement at the mounting plate 26 in the X direction using a second series of internal elements also described in the copending application.

Figure 2:
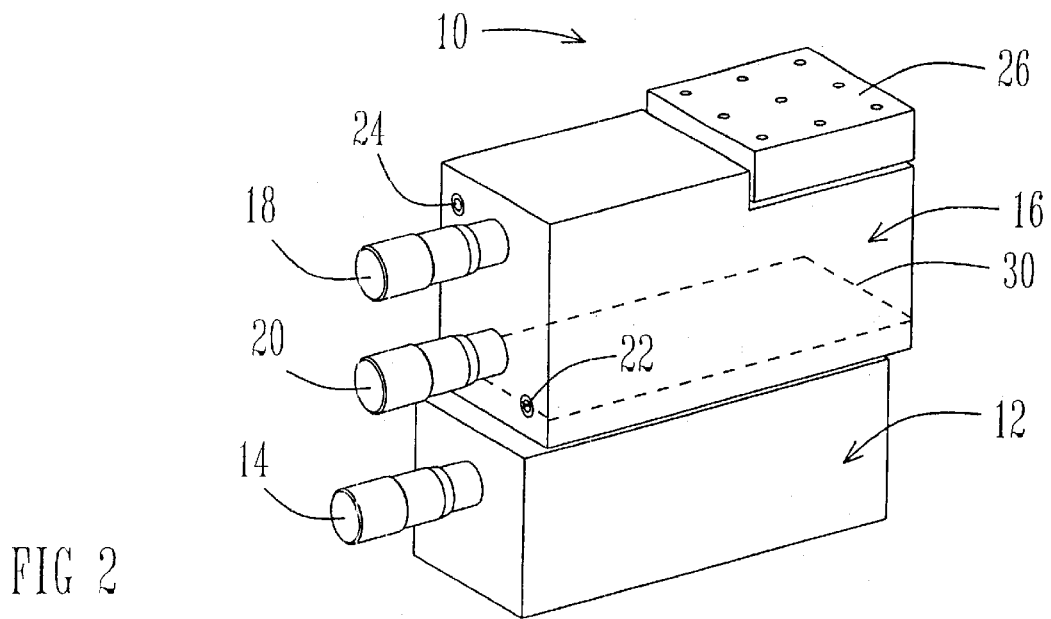
FIG. 2 shows a view of the positioner of FIG. 1 with a top portion displaced relative to a bottom portion.

FIG. 2 shows the top portion 16 of the 3-axis positioning device 10 displaced in the Z direction relative to the linear translation stage 12 on which it mounts. It can be seen that actuators 18, 20 mount directly to the top portion 16 which is fastened to a movable support provided by top plate 30 of the first linear translation stage 12. This configuration greatly reduces sensitivity of the overall 3-axis positioning device 10 as the forces generated when adjusting the actuators are transferred directly to the linear travel stage 12. The system sensitivity to adjustment forces is then only limited by the stiffness of a single linear translation stage 12; as compared to the standard stacked XYZ positioner configuration where each stage carries an actuator which will be subject to manual forces.

Figure 3:
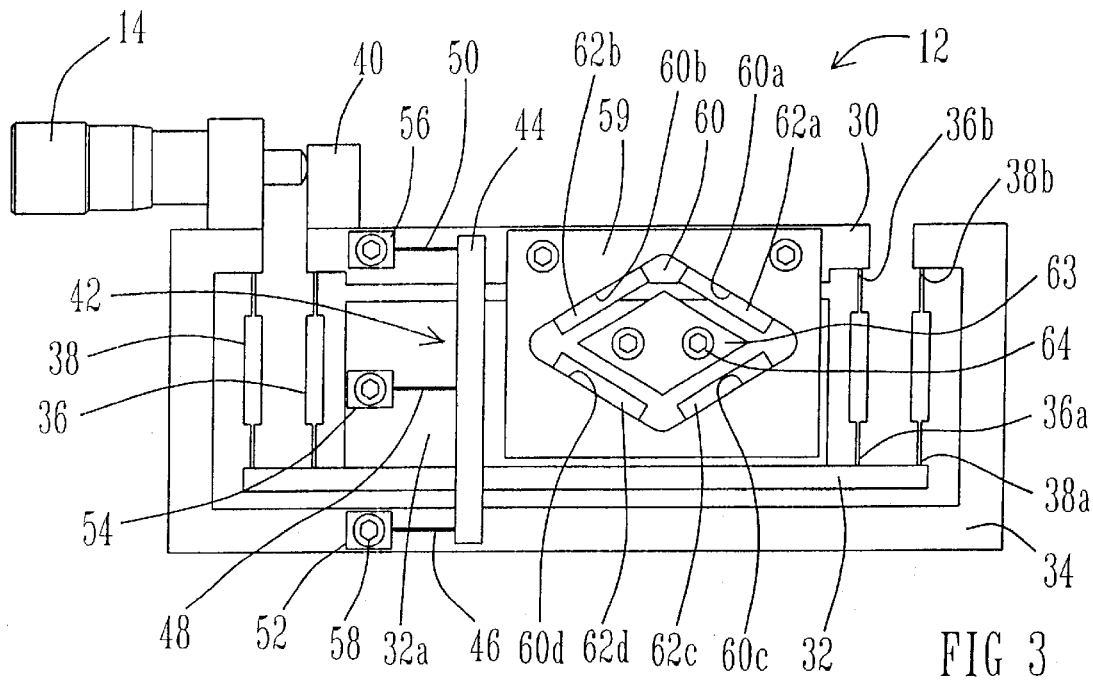
FIG. 3 shows a schematic representation of one side of a compound linear flexure translation stage of the same positioner showing magnetic means which has been added.

In FIG. 3 there is a side view of a schematic representation of a linear translation stage 12 with all flexible elements in an initial unstressed state. The stage 12 is shown as a dual cantilever flexure stage, however an alternate form of stage 12 such as a crossed roller bearing stage could be substituted in the complete 3-axis positioning device 10 as shown in FIG. 1 without altering the utility of other aspects of the invention. The linear translation stage 12 as shown is comprised of two parallel cantilever stages of parallelogram type, the first formed by a pair of first thin flexible plate elements or flexures 38 which have one end affixed to a stationary support or reference frame 34 and the other respective ends fastened to an intermediate support or movable plate 32. In the ideal arrangement the two flexures 38 are of equal length and under displacement the relative motion between the movable plate 32 and the fixed reference frame 34 will then be a parallel arcing motion. A similar second parallel cantilever stage is formed by the intermediate support or movable plate 32 which is connected to the top movable plate 30 by a pair of second thin flexible plate elements or flexures 36 having their respective ends affixed to the plates 30, 32 as shown. The relative motion between the intermediate support or plate 32 and the movable top plate 30 is also a parallel arcing motion providing that the flexures 36 are of equal length. The relationship is such that the first and second flexures 36 and 38 are of equal length and stiffness, and are oppositely arranged and dimensioned so that deviations from the desired rectilinear movement of the movable support caused by arc movements of the first flexures 38 are compensated by the arc movements of the second flexures 36 so that the movement of top plate 30 is accurately rectilinear.

An actuator 14 shown as a micrometer head acts on an anvil block 40 which is affixed to the top movable plate 30, and a coil spring (not shown) is connected in tension between the actuator end of the frame 34 and a central portion of a carrier block 30a which is solid with, and suspended from, the top movable plate 30.

A feature of this arrangement is a forcing or control means 42 which acts upon the structure to control the relative motion of the movable plates 30, 32. The control means in its ideal form is elastic and frictionless but can also be made up of rigid linkages with frictional bearing joints without altering the scope of the invention. The control means includes rigid beam member 44 having attached near one end a first flexure 46 that mounts to a first termination block 52 at its other end, said termination block 52 being fastened to the stationary reference frame or support 34 with one or more fastening element 58 or alternate attachment means such adhesives. Affixed to the beam member 44 at or near its center is a second flexure 48 that mounts at its other end to a second termination block 54 that is fastened to an upstanding carrier block 32a which is itself carried by the intermediate support or movable plate 32. This block 32a, which was not present in the construction described in the aforesaid copending application, provides a mount for magnetic means which will be described below. Affixed to the beam member 44 near the opposite end is a third flexure 50 that has its other end affixed to a third termination block 56 that is fastened to the top movable plate 30. Preferably the spacing between first flexure 46 and the second flexure 48 in the Y direction as defined by the axis designator 28 is the same as the spacing between the second flexure 48 and the third flexure 50; i.e. the connection to the intermediate support or plate 32 is midway between the other connection points.

Figure 4:
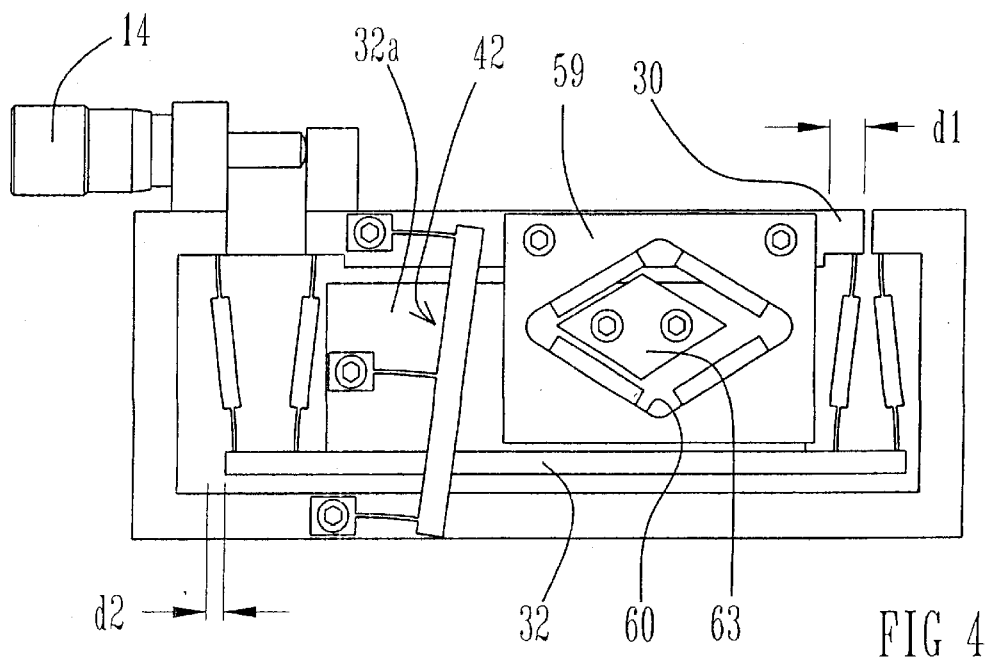
FIG. 4 shows the translation stage in a displaced position relative to that of FIG. 3.

FIG. 4 shows the stage 12 of FIG. 3 in a deflected position with the movable plate 30 having been displaced in the Z direction by a distance $d_1$ by a corresponding movement of the actuator 14. The control means 42 in its ideal form as defined in FIG. 3 will impart a displacement $d_2$ that is one half that of $d_1$ onto the intermediate plate 32. If the control element 42 were removed then the top movable plate 30 would still move in a perfect linear trajectory in the Z direction provided that the flexures 36 and the flexures 38 were of equal length and flexure stiffness in the Z direction and no external load in the Y direction were applied to the top movable plate 30. If the stiffness were not equal or an external load were present then the control means 42 would be required to ensure that the displacement $d_2$ was half that of $d_1$ which is the condition required to ensure that the arc error motion of the first parallel cantilever stage is equal to that of the second parallel cantilever stage. The two arc error motions of the two parallel cantilever stages are opposite in relative direction and cancel each other when the aforementioned conditions are met resulting in perfect linear motion at the top movable plate 30.

The arrangement of these parts, and especially the fact that the flexures 36 and 38 are all of the same length, means that if temperature changes cause any differential expansion of the flexures relative to the other parts this is automatically compensated and does not affect the height of the movable plate 30.

FIGS. 3 and 4 also show how the structure accommodates the magnetic means. These latter means include the upstanding carrier block 32a which is mounted so as to be solidly movable with the intermediate support 32, and which has an upper portion seen in FIG. 4 which extends up to within a short distance of the plate 30. In front of this block 32a in this view is the suspended carrier block 59 which is of ferromagnetic material and is attached to the upper plate 30. The suspended block 59 has a central aperture 60 in the shape of a rhombus, having upper, inwardly facing surfaces 60a and 60b which slope downwardly at angles of less than 45 degrees from an upper center of the aperture, and having lower, inwardly facing surfaces 60c and 60d which slope upwardly at angles of less than 45 degrees from a lower center of the aperture. The surfaces are preferably symmetrical both about a normally horizontal centerline, and about a vertical centerline. Each of these four surfaces is provided with a generally flat, parallel sided magnet, designated respectively 62a, 62b, 62c, and 62d. Within this aperture is movable a ferro-magnetic attraction member 63 which projects forwardly into the aperture, and which is fixed by a screw 64 to the upstanding carrier 32a. The member 63 is of rhombus form, having four sides each parallel to one of the aperture sides. This member 63 can have on its surface additional magnets for increased pull.

The mechanism is provided with stop means, not shown, so that the attraction member 63 moves within a limited range of movement, with the stop means being such that the attraction member never comes into contact with the magnets. With the sloping magnet arrangement, however, the range of movement of the member 63 can be greater than the maximum air gap between this member and the magnets. The position of the ferro-attraction member 63 is generally such that when the flexures 36 and 38 are parallel to each other the member 63 is slightly displaced from the center of the aperture 60 and closer to magnets 62a and 62c than to the other magnets; this has the effect of biasing the movement in conjunction to the tension spring which urges the plate 30 towards the actuator 14. If this biasing effect is made significant enough then the tensioning spring may be omitted. The magnets attract the member 63 towards its end positions and thus act against the restoring forces of the flexures. The magnets can be arranged to counteract a large part or all of the forces provided by the flexures, say around 90% of the forces given by the flexures.

Figure 5:
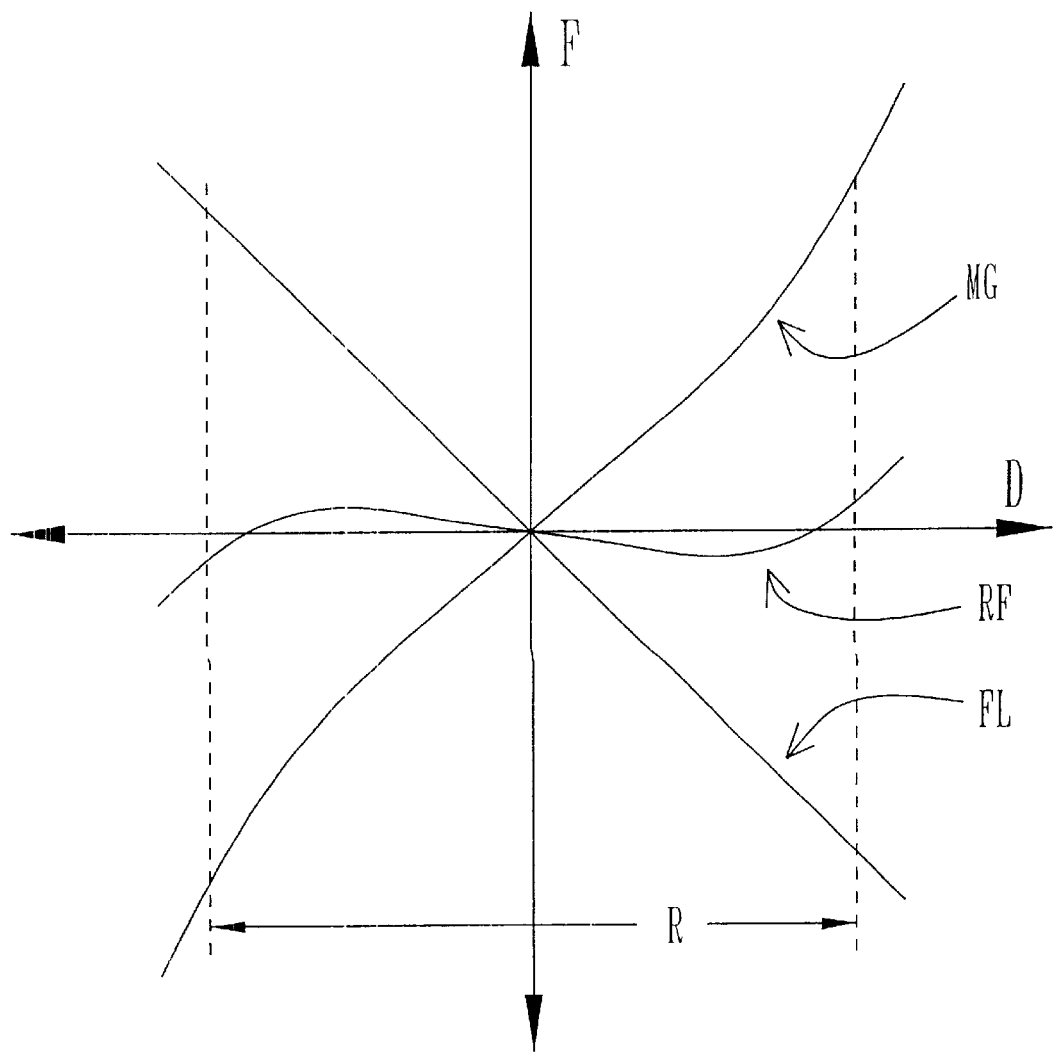
FIG. 5 is a graph showing the relationship between the magnetic forces and the restoring forces of the flexures as provided by the magnetic means used in the structures of FIGS. 3 to 4.

FIG. 5 shows graphically how magnetic forces provided by permanent magnets such as magnets 62a, etc, can be used to counteract spring forces of the flexures to give a mechanism which requires little force for movement, while using flexures which are stiff enough for desired stability. FIG. 5 is a graph showing the forces provided by the flexures, as line FL and the opposing forces provided by the magnets shown as line MG against the deflection D. It will be seen that the flexure force line FL is substantially linear, and that the magnetic force line MG, although not strictly linear, nevertheless has a substantially linear central portion when the magnets are suitably arranged and chosen. It will be seen that the resultant forces, shown at line RF, are much smaller than the spring forces which would normally be experienced by use of the chosen flexures, and are a small percentage of the flexure force FL.

The magnetic forces are chosen so as to counteract most or all of the spring forces, but movement is controlled so that magnetic surfaces do not contact each other and do not apply forces greatly in excess of the spring forces. For example, the magnets may be arranged so that the maximum magnetic forces experienced at extreme positions are between 70% and 130% of spring forces operative at those extreme positions.

B: Six Axis Positioner; General

Figure 6:
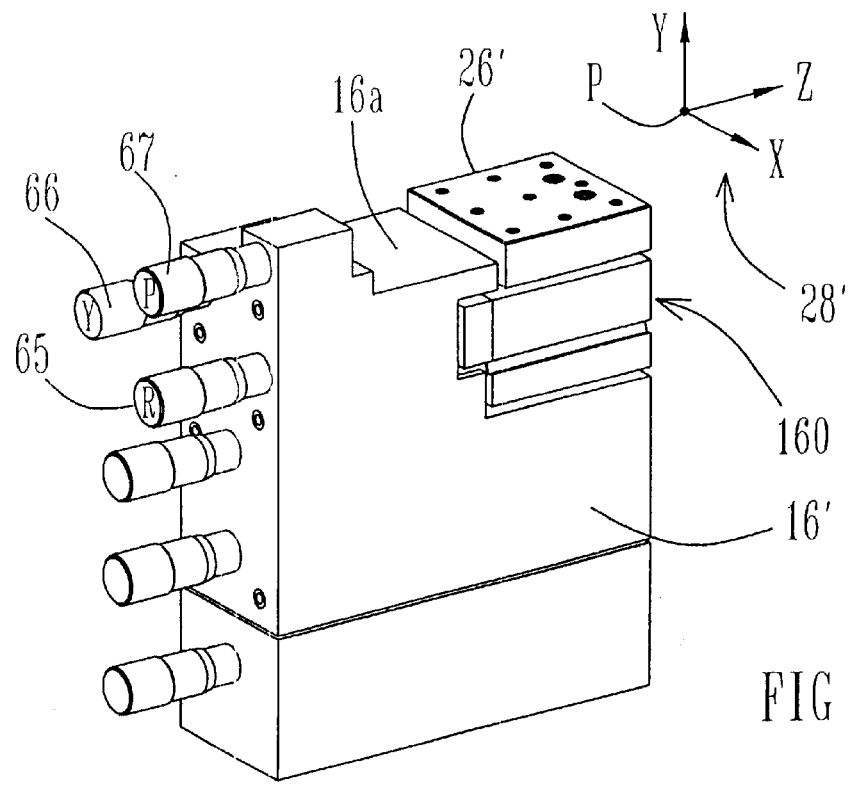
FIG. 6 shows perspective view of a 6 axis positioner in accordance with the present invention, and which includes a three axis angular positioner mounted on the movable support of a three axis positioner similar to that of FIGS. 1 to 4.

FIG. 6 shows a perspective view of a six-axis positioner of the present invention which incorporates a three-axis positioner similar to that described above. The translation stage 12 of the six-axis positioner is exactly as previously described for the three-axis positioner, while the top portion 16' is similar to portion 16 previously described for the three-axis positioner but has an additional upper extension 16a which carries three additional micrometer type actuators 65, 66 and 67. These actuators extend parallel to the linear motion actuators 14, 18 and 20 and are conveniently positioned above those other actuators. The actuators 65, 66 and 67 are connected, by a mechanism contained in upper extension 16a, to control three stages of angular movement of a holder support 26' for example designed to receive an optical fiber holder, about three mutually perpendicular axes X, Y, and Z. These axes all meet at a point P in front of and above the holder support 26', this point being shown as the meeting place of these axes as indicated by axis designator 28'.

While this specific description relates to the six-axis positioner, it will be understood that many features of the present invention can also be used in 4 or 5 axis positioners, i.e having three linear movements and one or two additional angular adjustments.

When the holder on support 26' is used to position an optical fiber, this fiber is usually fixed so as to be co-axial with the Z axis. The three angularly movable stages include a first, roll stage 160 which provides rolling motion about the Z axis, a second stage 162 providing yaw motion about the Y or vertical axis, and a third stage 164 providing pitch motion about the X axis. These stages will be described below with reference to FIGS. 13 to 19.

C: Six Axis Positioner: X and Y Axis Rectilinear Movements

Figure 7:
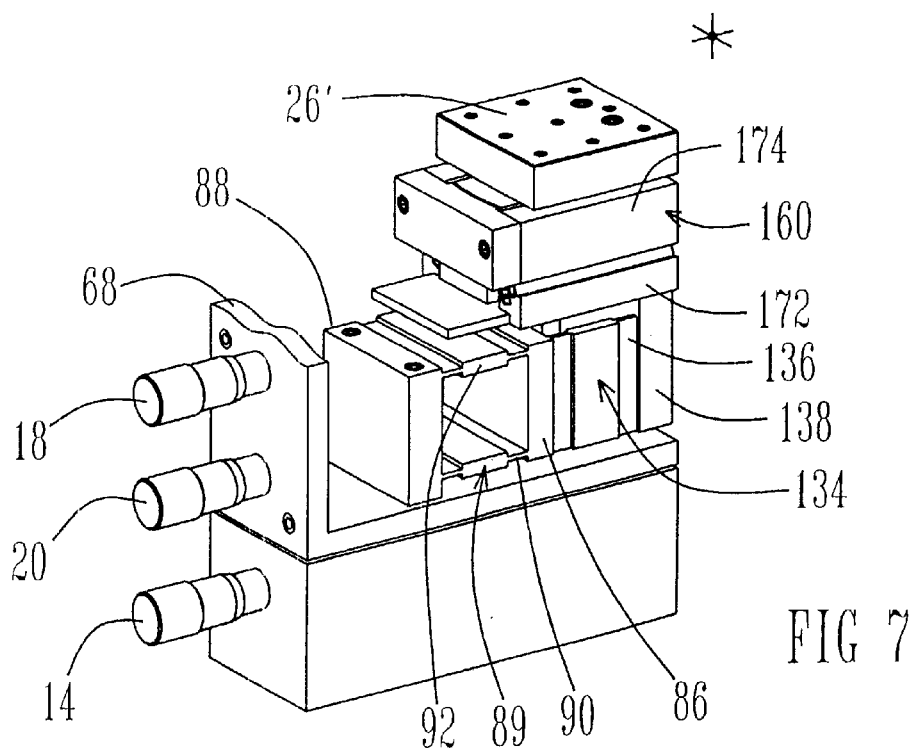
FIG. 7 shows a view of the positioner of FIG. 6 partially disassembled.
Figure 8:
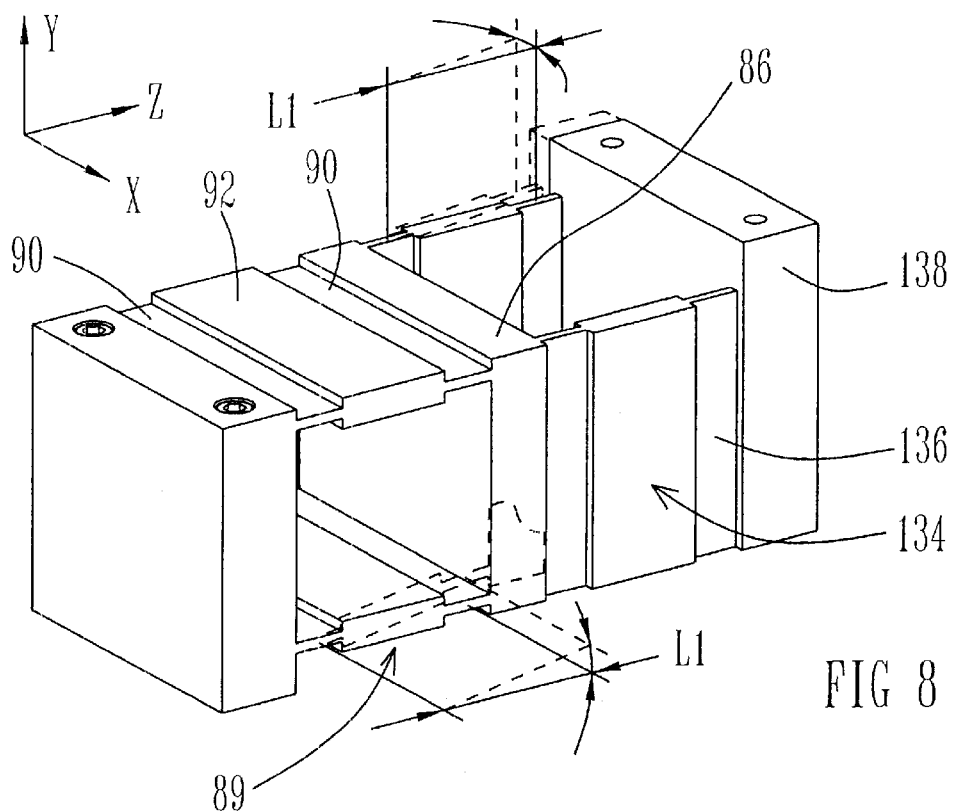
FIG. 8 shows a detail view based on that of FIG. 7 indicating the operation of the X and Y stages.
Figure 9:
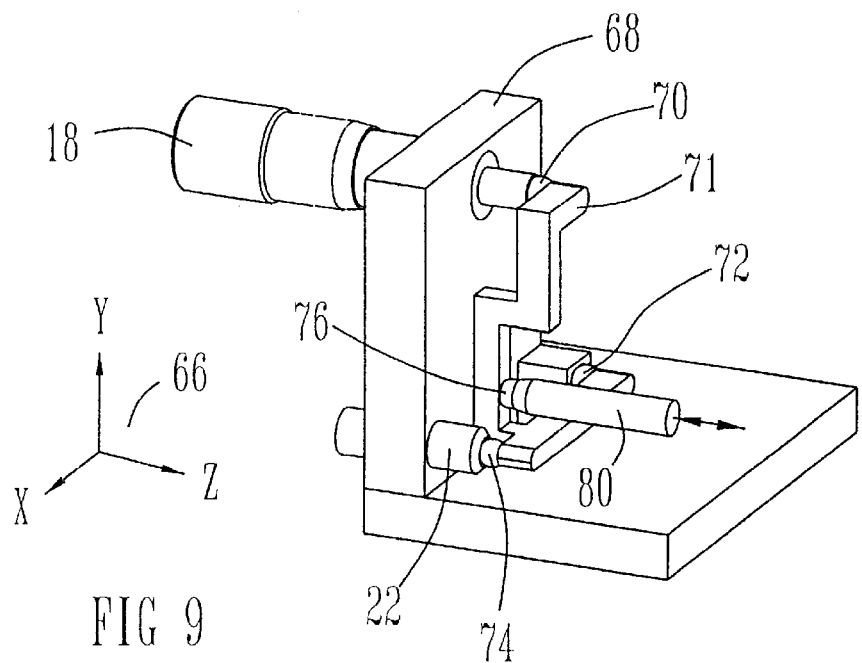
FIG. 9 shows a perspective, diagrammatic view of part of the actuator control mechanism for the second or Y (vertical movement) stage of the positioner.

FIGS. 7 to 9 illustrate details of the last two stages of the three-axis positioner which provide rectilinear movement of a support plate 138 in the X and Y axes, and which are described in greater detail in the copending U.S. application as aforesaid, with reference to FIGS. 5 to 11 of that application. Briefly, a vertical mounting plate 68 fastened to the top movable plate 30 carries the actuators 18 and 20 which provide the X axis (crosswise) and Y axis (vertical) movements, as will be described below. As shown in FIG. 7, in front of plate 68 is another fixed vertical plate 88, which is connected by a parallelogram type linkage comprising two parallel planar flexures 89, to a movable support plate 86 which moves in the vertical or Y direction, this being perpendicular to the horizontal planes of the flexures 89. The flexures 89 each have two thin flexible portions 90 one on each side of an inflexible plate portion 92; such flexures allow relatively easy movement perpendicular to their planes but are stiff against forces within their planes. The vertically movable support plate 86 is, in turn, connected to a movable support plate 138 by a second parallelogram linkage comprising two similar flexures 134 having thin flexible portions 136; the here the flexures are vertically orientated to provide X axis movement, i.e. cross-wise horizontal movement, between the plates 86 and 138.

It will be seen that the two linkages provide for X and Y movements of the support plate 138. In each case the movement provided is a swinging movement of the support plate about a radius which is determined by the effective length "$L_1$" of the flexures 89 and 134. As indicated in FIG. 8, this length is the distance between the centers of the thin flexible portions 90 and 136 of each flexure, and these lengths are chosen to be identical. The resultant movement of the support plate 138 relative to the support plate 30 is such that points on plate 138 move on the surface of a sphere with radius "$L_1$".

The mechanism which links the actuators 18 and 20 to the support plates 86 and 138 is described in detail in the copending U.S. application as aforesaid, in relation to FIGS. 5 to 11 of that application; a portion of this mechanism, that relating to converting the X and Y actuator movements in the Z direction to controlled movements in the X and Y directions, is shown herein in FIG. 9. The shaft of actuator 18 pushes on a contact element shown as a partial spherical element 70 which contacts the upper end portion of a lever or pivoting plate 71. This lever 71 has a lower end portion with laterally spaced spherical surfaces 72 and 74 which contact, respectively, a fixed support and an inner end of adjustment screw 22. The arrangement of three spaced supports for the lever 71 means this is positively and rigidly located by the actuator 18 and the adjustment screw 22. Another spherical element 76 forms a ball joint between an inner end of a push rod 80 and an intermediate part of the lever 71, so that adjustment of the actuator moves the push rod with a considerable mechanical advantage, giving extremely fine adjustment to axial movement of the push rod. The push rod 80 in turn acts on an orthogonal drive mechanism (not shown) which translates the axial movement of the rod into the required vertical (Y axis) movement of the support plate 86. This drive mechanism makes use of a pair of crossed cantilever flexures, and is described in relation to FIGS. 7 and 8 of the aforesaid copending U.S. application. A similar mechanism, described with reference to FIG. 11 of the copending U.S. application aforesaid, provides the X axis movement of the support plate 138 upon operation of the actuator 20 and/or adjustment of the adjusting screw 24 shown in FIG. 1 of the drawings.

Figure 10:
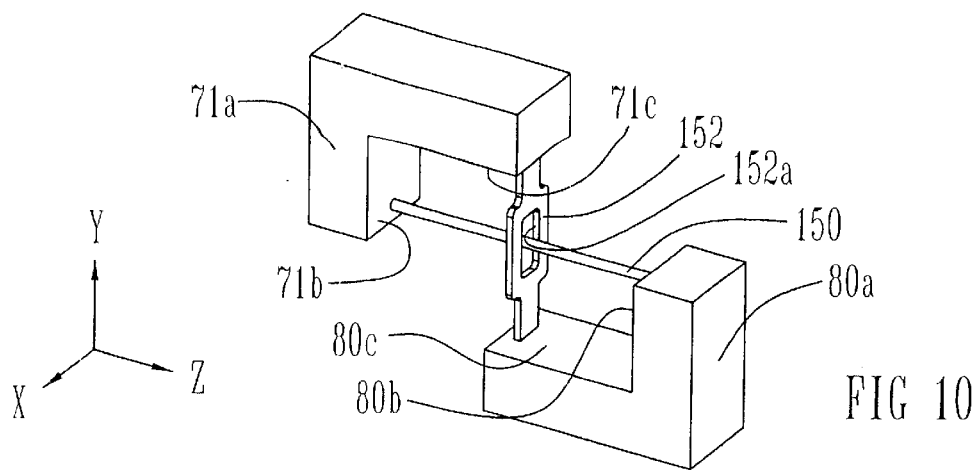
FIGS. 10 to 12 show diagrammatic views, in different positions, of a flexible joint which may be used in several locations in the positioner.
Figure 11:
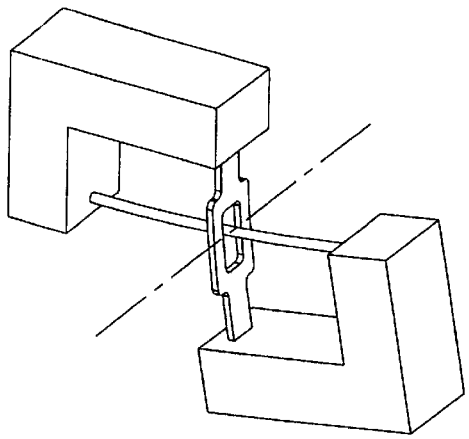
Figure 12:
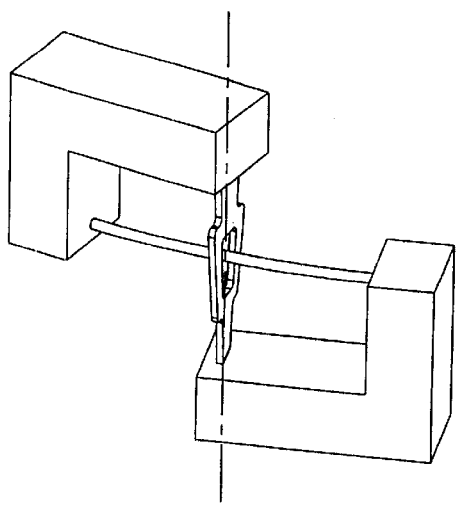

FIGS. 10 to 12 show a flexible joint which may be used in place of the ball joint 76 of FIG. 9, and which may be used in other mechanisms requiring flexible joints which will be described below. As shown, the joint includes a first portion, indicated at 71a, in this case being a part of lever 71, and a second portion 80a which in this case is part of the push rod 80. The two portions have opposed L shaped recesses, including opposed vertical surfaces 71b and 80b and opposed horizontal surfaces 71c and 80c. The vertical surfaces 71b and 80b are connected by a first flexure 150 in the form of a flexible rod, and the horizontal surfaces 71c and 80c are connected by a flexible strip 152 having an aperture 152a through which passes the flexure 150. The arrangement allows relative flexing between the portions 71a and 80a as indicated in FIG. 11, and relative rotation as shown in FIG. 12. The use of the additional member 152, as compared to use of a single rod flexure, provides a stable and predetermined position for the center of flexing, which is shown by the broken lines in FIGS. 11 and 12, is in each case coincident with the crossing point of the two flexures.

Other forms of this flexure mechanism may be used, in each case providing an orthogonal pair of flexures which have intersecting center lines. These would include a flexible strip, like strip 152 but having one side of the aperture open, or the strip 152 might be replaced by a pair of wires symmetrically placed on opposite sides of wire 150.

D: Six Axis Positioner: Details of Angular Movements

Figure 13:
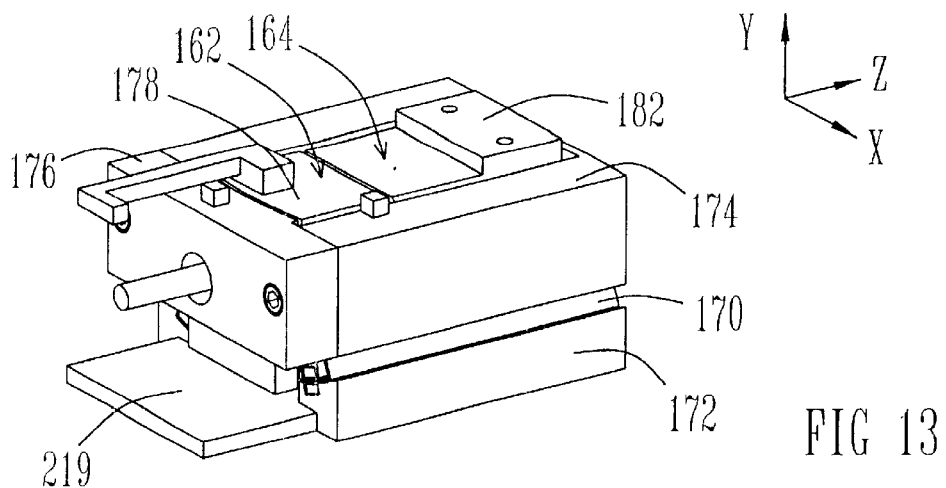
FIG. 13 shows a perspective view of a roll stage of the six axis positioner, and which also accommodates the yaw and pitch stages.
Figure 14:
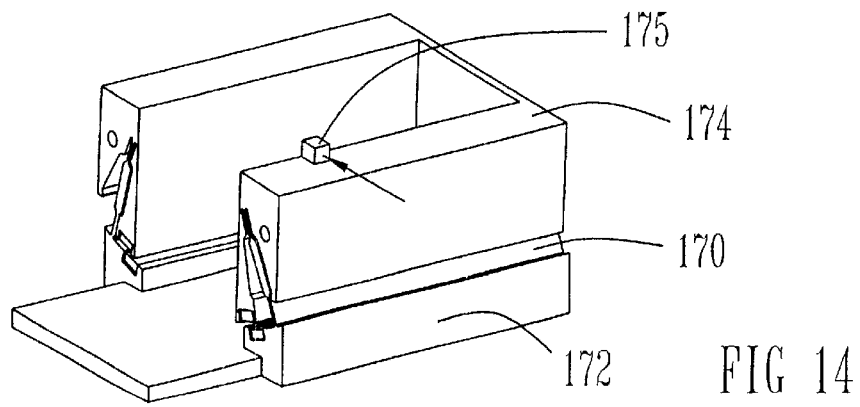
FIGS. 14 and 15 show views of the roll stage with the yaw and pitch stages removed.
Figure 15:
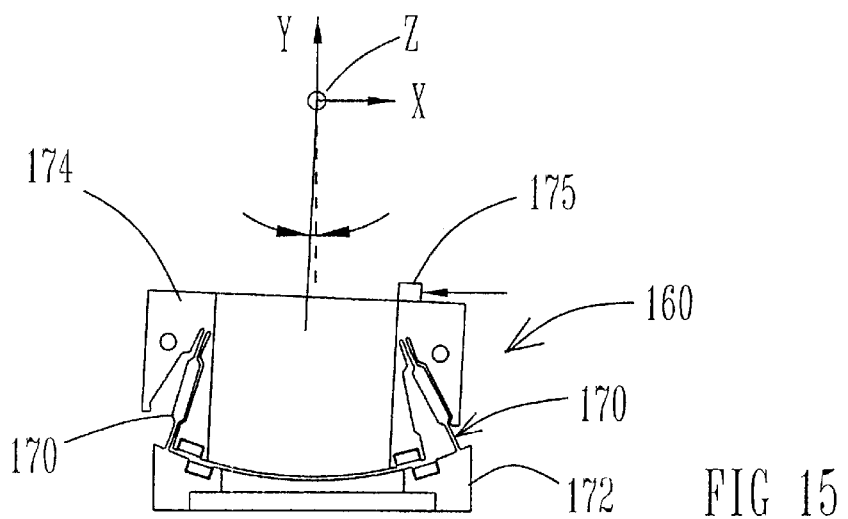

FIGS. 13 to 15 illustrate the roll or Z axis angular movement stage 160 which includes a base 172 fixed to the support plate 138. Adequate accuracy for this roll stage, in the context of fiber optic work, can be achieved with two simple flexures which can be similar to those shown for example in FIGS. 7 and 8 of the aforesaid U.S. Pat. No. 4,686,440 to Hatamura et al. As shown in FIGS. 14 and 15, these flexures 170 extend from a relatively fixed base 172 to the roll stage support 174 in converging planes which meet at the Z pivot axis which is indicated in FIG. 15. The two later stages of angular adjustment 162 and 164, which respectively provide the yaw and pitch adjustment of the fiber, need to be very precise since these provide the angular alignment of the fiber carried by the holding means with another fiber or other optical component, and it is desirable that adjustment of these stages do not upset the X and Y axis linear adjustments. The precise flexure arrangements for achieving this precise movement will be described below with reference to FIGS. 20 to 23

E: Control Mechanism for Angular Adjustment Stages: General

As shown in FIGS. 14 and 15, the flexures 170 join the base 172, which is fixed to support plate 138, to a hollow housing 174 which constitutes the movable part of the roll stage 160. An upper surface of the housing 174 has a moment arm member 175 which is moved, via a control mechanism described below, by actuator 65, to cause angular movement of the roll stage about the Z axis which is indicated in FIG. 15.

Figure 17A:
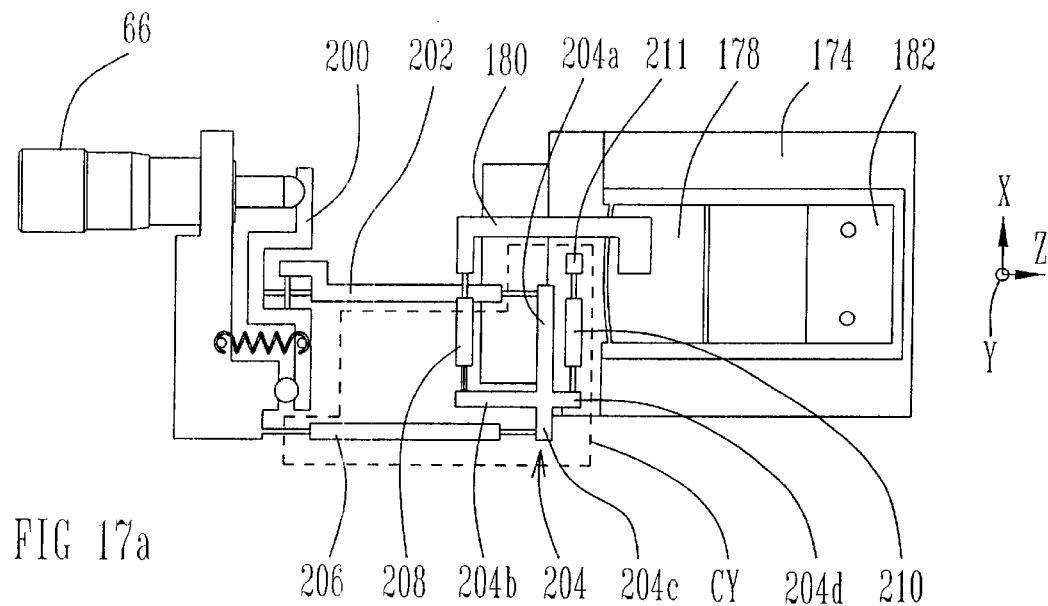
FIGS. 17a and 17b show diagrammatic plan views of a control mechanism for the yaw stage, in successive positions.
Figure 17B:
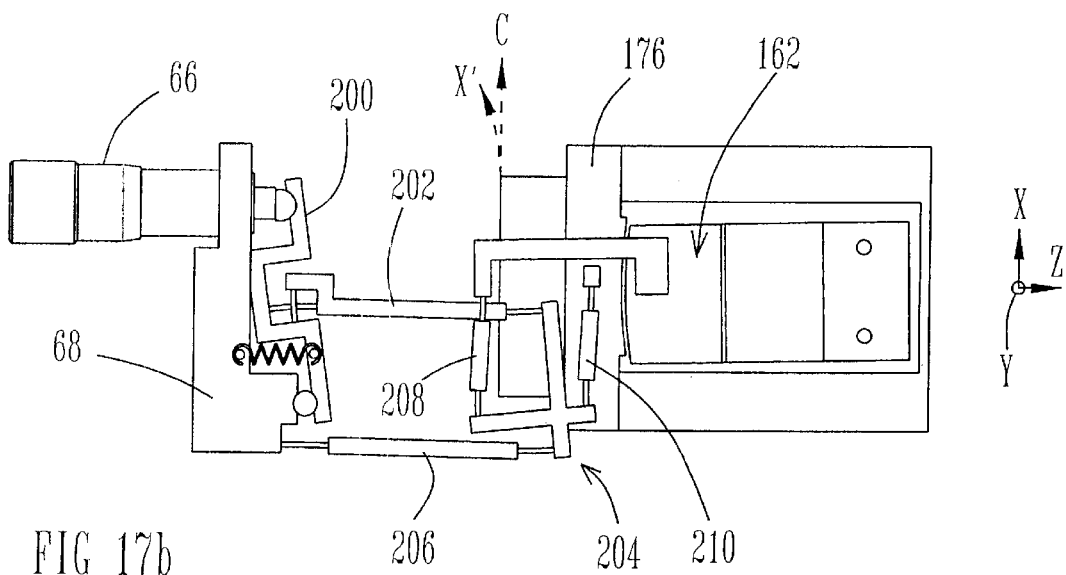

As shown in FIG. 13, the yaw stage 162 and pitch stage 164 fit within the hollow housing 174 of the roll stage; FIGS. 14 and 15 show this housing with the later stages removed. Referring to FIGS. 17a to 19, the yaw stage 162 includes a support 176 fixed to the rear end of the roll housing 174 and connected by a flexure arrangement, to be described below, to an angularly movable support 178, the angular movement of which occurs about a vertical Y axis indicated in FIG. 17a, which axis is in front of the holding means 26'. As shown in FIGS. 17a and 17b, the support 178 carries a moment arm 180 which extends rearwardly over the support 176, where it is subjected to sideways (i.e. X axis) forces by a control mechanism described below, and which is controlled by actuator 66.

Figure 18:
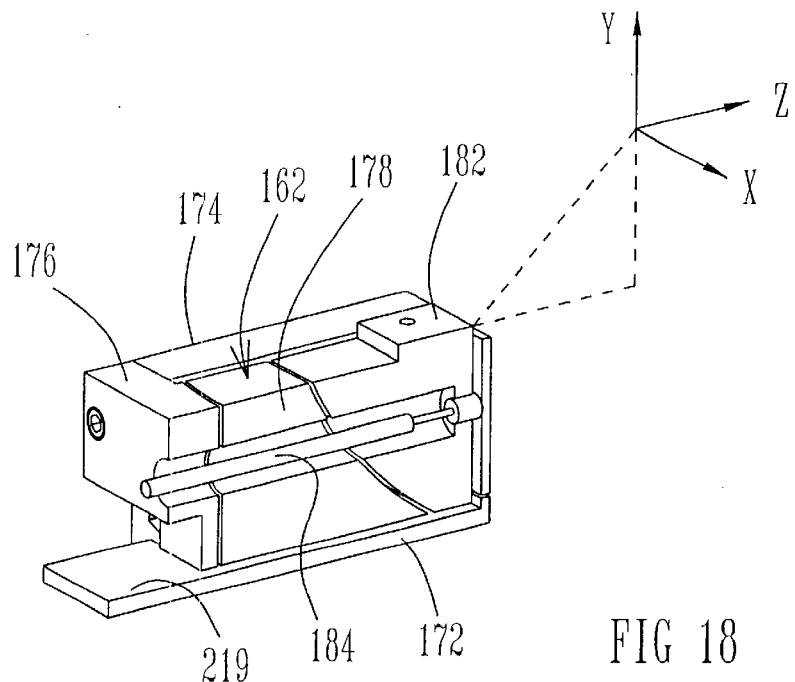
FIG. 18 shows a partly cut away, perspective view of parts of the roll, yaw and pitch stages showing part of the control means for the pitch stage.
Figure 19:
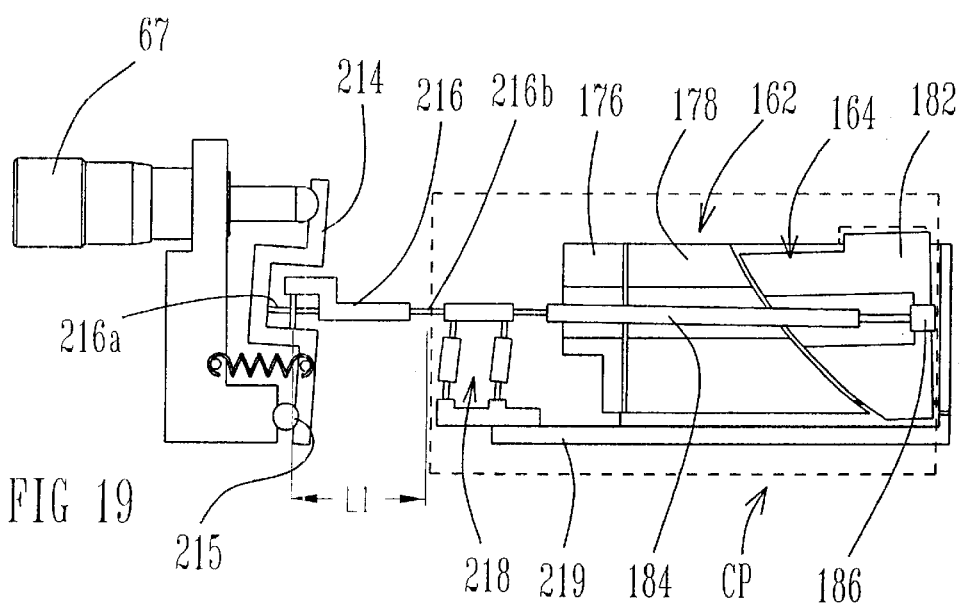
FIG. 19 shows a diagrammatic, longitudinal section of the same stages including the whole control mechanism for the pitch stage.

FIG. 18 shows a diagrammatic and cut-away view of the yaw and pitch stages as removed from the roll housing 174. The rear of the yaw stage support 178 is connected by flexures, also to be described below, to a holder support 182, the flexures being such as to allow pitch movement, i.e. tilting of the support 182 about an X axis which preferably is in front of and above the holder support 182 as indicated in FIG. 19. The pitch motion of the support 182 is controlled by a control mechanism including an axially movable member or push rod 184 linked to actuator 67, and which passes into a hollow interior of the support 182 and pushes on an abutment 186 off-set well below the pitch axis indicated in FIG. 19.

The actuating means linking the actuators 65, 66 and 67 to the movements of the respective roll stage 160, yaw stage 162, and pitch stage 164, are all designed so that the actuators can be carried by the axially movable stage 16' and can transmit adjustments accurately to the respective angular adjustment stages without the linear movements of the X and Y movement stages, or the angular movements of the later stages, interfering substantially with the accuracy of the adjustment. These actuating means, respectively designed for the roll, yaw and pitch stages, will now be described with reference to FIGS. 16a, 16b, 17a, 17b, 18 and 19. Each actuating means is characterized by an axially movable control link or push rod projecting forwardly and linked to the appropriate actuator, and by a control mechanism mounted on the support which holds the stage and which includes:

a) restraining means for causing the outer end of the link to move laterally (including vertically) with the relevant support while allowing it to move axially relative to the support plate; and b) motion conversion means for converting axial movement of the control link relative to the support into angular movement of the relevant stage relative to the support.

E1: Control Mechanism for Roll Stage

Figure 16A:
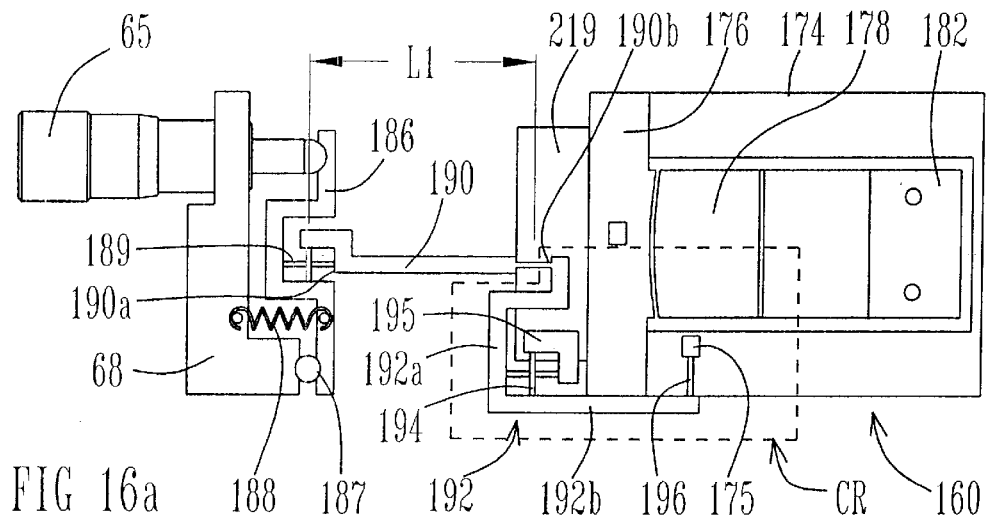
FIGS. 16a and 16b show diagrammatic plan views of the control mechanism for the roll stage, in successive positions.
Figure 16B:
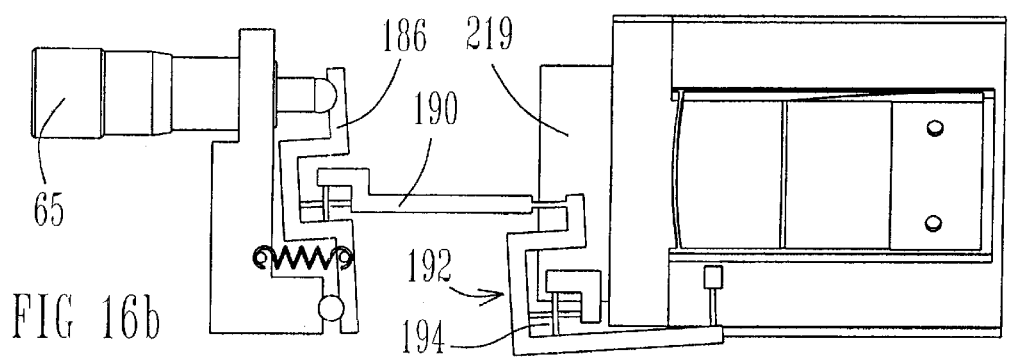
Figure 16C:
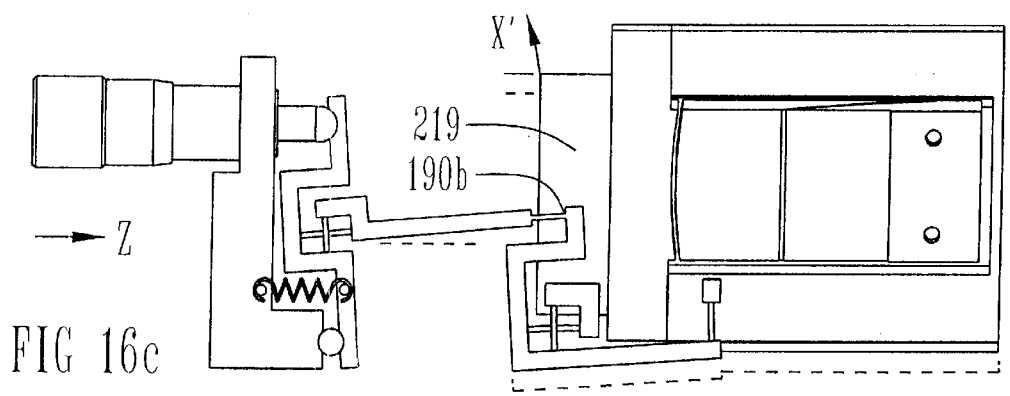
FIG. 16c shows a diagrammatic plan view of the control mechanism for the roll stage, with the roll stage following the movement trajectory of the X or Y stage.

FIGS. 16a to 16c show the actuating means whereby the roll stage 160 is controlled by the actuator 65 mounted on mounting plate 68. The front end of actuator 65 controls one end of a lever 186 similar to lever or pivoting plate 71 of FIG. 9, and having its other end located by fulcrum 187 also attached to the mounting plate 68, the lever being held against the actuator and fulcrum by tension spring 188. An intermediate area of the lever 186 is connected by flexure 189 to the rear end 190a of a link or push rod 190 which has its outer or front end 190b connected by a flexure joint to one arm of a lever portion 192a of bell crank 192, this bell crank providing part of a control mechanism indicated generally as CR. This bell crank 192 has a fulcrum provided by a flexure 194 held by a part 195 which is fixed to the support 219 extending from base 172 of the roll stage. The other arm 192b of the bell crank 192 has its end connected by a further axially movable link 196 to the moment arm member 175 on the movable housing 174 of the roll stage. Accordingly, as shown in FIG. 16b, withdrawal movement of actuator 65 pulls on link 190, with a mechanical advantage of the order of 2 to 1, and movement of link 190 in turn causes the bell crank 192 to push on link 196 and thus causes angular movement of the roll stage 160.

It will be noted that the flexure connection 189, and the fulcrum 194, are both preferably formed as crossed cantilevers of the type shown in FIGS. 10 to 12.

In this arrangement the bell crank 192 both provides a restraining means for causing the outer end 190b of link 190 to move laterally, i.e. in the X and Y directions, with movements of the base 172 and plate 138, and also provides a motion conversion means to translate axial movement of the link 190 into angular movement of the roll stage. A key feature of this mechanism is that the link 190 is made to have the same effective flexure length as the length "$L_1$" of the flexures 89 and 134 shown in FIG. 8. Accordingly, as indicated in FIG. 16c, when the third stage support plate 138 and the roll stage base 172 are moved by the X and Y axis actuators 18 and 20 in the X' and Y' directions, of which only the X' direction is shown, without movement of the roll stage actuator 65, the link 190 swings about its end flexures on the same radius of movement as support plate 138 and base 172 and remains stationary relative to the base support 219; accordingly adjustment of the roll stage is isolated from the X and Y adjustments.

E2: Control for Yaw Stage

FIGS. 17a and 17b show the control mechanism connecting the actuator 66 to the yaw stage 162. Again, a spring held lever, shown at 200, is acted upon by the appropriate actuator 66, and the central part of the lever is connected by a flexure to the inner end of a control link 202 having its outer end connected to one arm 204a of a bell crank member 204. Again, a second arm 204b of the bell crank member 204 is operatively connected to the moment arm 180 which controls movement of the yaw stage 162.

However, this yaw stage differs from the roll stage in that the bell crank 204 is not held to a fixed fulcrum on a support; rather it is indirectly mounted on the roll stage in a manner which allows floating movement relative to this stage. Thus, the first arm 204a has an extension 204c beyond arm 204b which is connected by a second link 206 to the mounting plate 68; this second link is parallel to the control link 202 and forms a first parallelogram linkage connecting the mounting plate 68 and the lever 200 to the bell crank 204. The connection between the crank arm 204b and the moment arm 180 is provided by a third link 208, and the second arm 204b has an extension 204d connected by a fourth link 210 to a fixed point 211 on the support 176, with the links 208 and 210 forming a second parallelogram linkage for locating the bell crank 204. The flexure connectors at the ends of the links 202, 206, 208 and 210 may be as for links 190 and 196 of the roll stage.

With this arrangement, the roll stage can move, not only in the X or Y directions relative to the mounting plate 68, which are swinging movements experienced by the support plate 138 as illustrated in FIGS. 8 and 17b, but can also move in the circumferential manner about the roll axis, i.e. in the direction indicated as C in FIG. 17a, which direction diverges from the X and Y directions, without causing pivotal movement of the bell crank 204. The bell crank 204 is only caused to pivot in response to the pivot action of the lever 200 as caused by the actuator 66.

E3: Control Mechanism for Pitch Stage

FIGS. 18 and 19 show the actuating means for the pitch stage 164 and which causes angular movement of the holder support 182 about the X axis relative to the yaw stage support 178. As before, the appropriate actuator acts on one end of a lever or pivot plate 214 which is held by a spring against the fulcrum 215 at its other end. A central part of lever 214 acts on the inner end of axially movable link 216, this link being connected by flexures 216a and 216b respectively to the lever 214 and to an axially movable link extension in the form of push rod 184 shown in FIG. 19 and which provides part of control mechanism CP. This mechanism includes a restraining means in the form of a parallelogram linkage provided by parallel plate-like flexures 218 connecting a mounting 219, extending from roll support 172, to the outer end of link 216, and which restrains movement of the outer end of link 216 laterally relative to the support 172, both in the X and Y directions relative to the support, while allowing axial movement of the link 216 and the push rod 184. The outer end of rod 184 acts on the abutment 186 also shown in FIG. 19, which acts as a moment arm to cause pitch movement of the support 182 about the X axis as indicated in FIG. 18.

As indicated in FIG. 19, the control link 216 has an effective length $L_1$ the same as the flexures 89 and 134 shown in FIG. 8, so that movements of the support 172 in the X and Y directions, consequent to movements of the support plate 138, do not affect the axial movement of the rod 184. Also, due to the length of the push rod 184, the roll and yaw movements of the support 178 do not cause substantial errors in the adjustment of the pitch stage.

F. Flexure Arrangement for Yaw and Pitch Stages

FIGS. 20 to 23 show diagrammatically the flexure arrangement used both for connecting the yaw stage support 176 to the angularly movable support 178, and for connecting the support 178 to the pitch stage support 182. Both the yaw and pitch adjustments need great accuracy so that yaw and pitch adjustments do not cause movement of the fiber holding means in the X and Y directions.

The flexure mechanism of FIGS. 20 to 23 is illustrated specifically for the middle stage 162, i.e. that for yaw adjustment, but the outer stage giving pitch adjustment is similar in principle.

Figure 20:
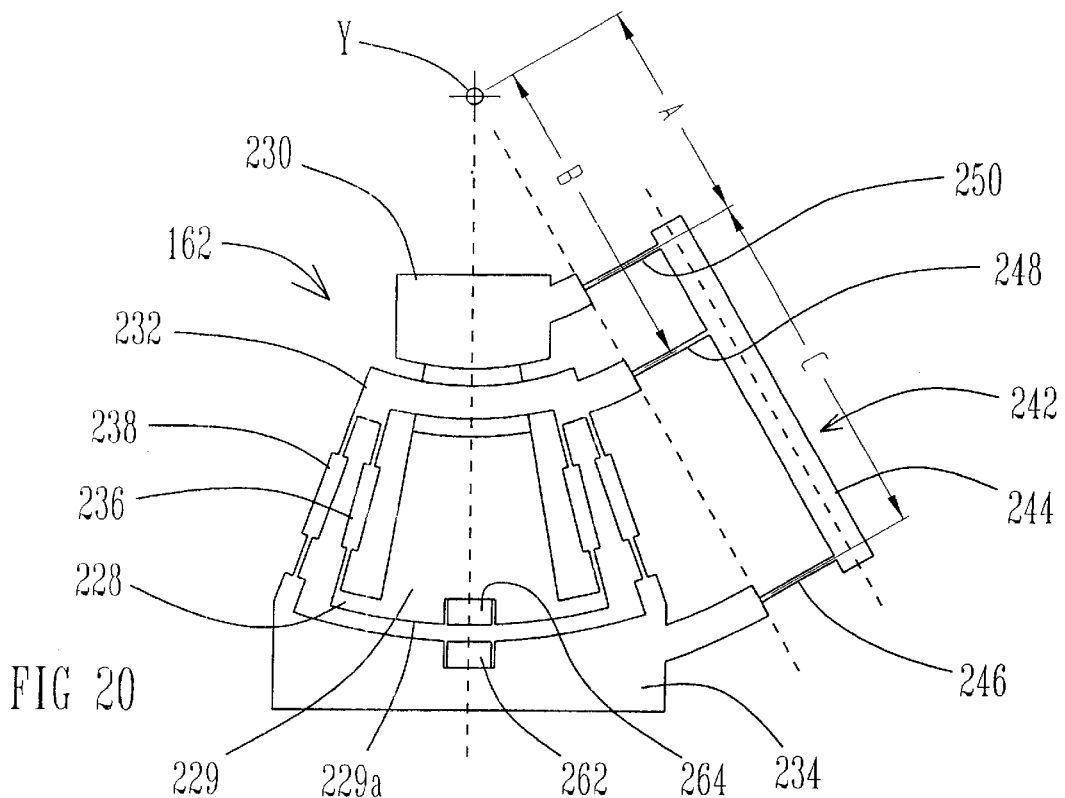
FIG. 20 shows a diagrammatic view of the second stage of the angular positioner, in an initial position.
Figure 21:
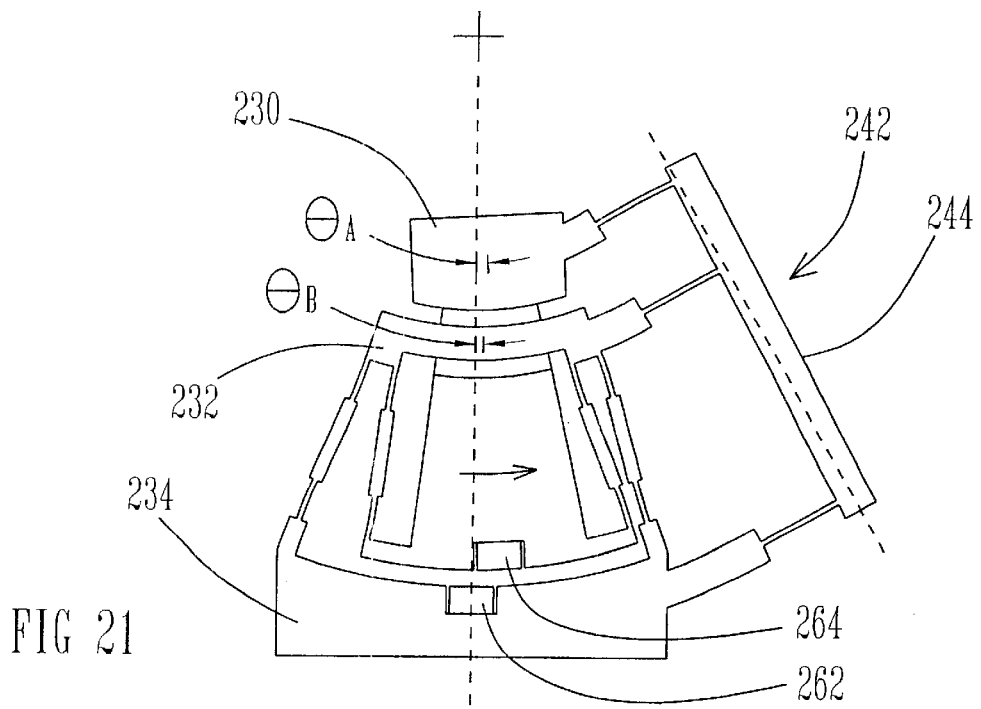
FIG. 21 shows the same parts as FIG. 20 in a deflected position.
Figure 22:
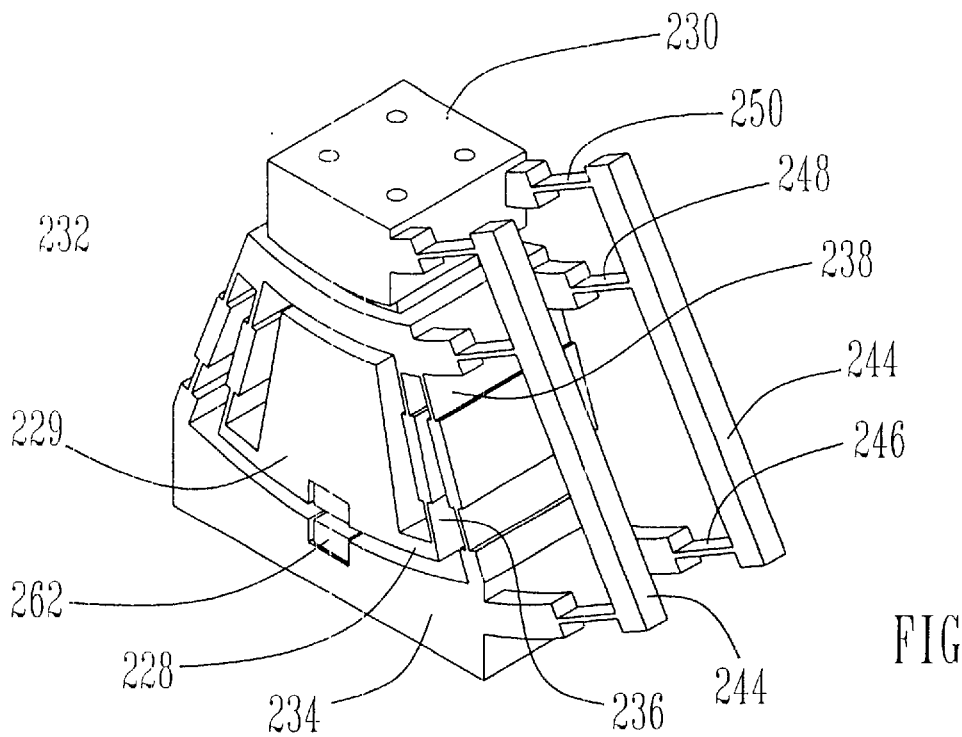
FIG. 22 shows a perspective view of the same parts as are shown in FIG. 20.
Figure 23:
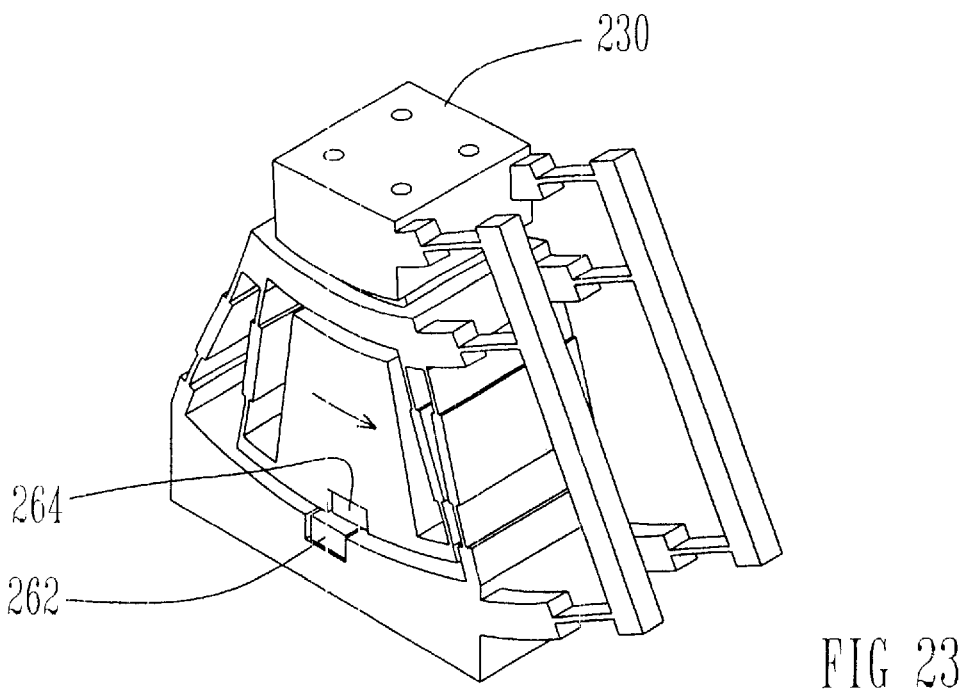
FIG. 23 shows a view similar to that of FIG. 22 but with the parts in the FIG. 21 position.

As shown in FIGS. 20 to 23, the angular adjustment stage 162 has a base or first support 234 mounted on the roll stage 160, and which is connected to an angularly movable intermediate support 232 by a pair of first spaced plate-like flexible elements or flexures 238. The intermediate support 232 is in turn connected by a pair of second, similar flexures 236 to side extensions 228 of a block 229 which has an outer curved surface 229a in close proximity to the inner curved surface 234a of the first support 234. The block 229 projects radially inwardly through a hollow central portion of the intermediate support 232 and terminates in a movable support 230, which in turn carries the next stage, e.g. the pitch stage 164. As shown in FIG. 20, when the parts are in an unstressed initial position, all of the flexures 236 and 238 extend radially relative to the Y axis, the position of which axis is shown in FIG. 20. Bending of the flexures 236 and 238 allows angular movement of the support 230, as illustrated in FIGS. 21 and 23.

It was explained above with respect to FIGS. 3 and 4 that, where rectilinear motion is concerned, the intermediate support 32 needs to be restricted to one half the movement of the movable support 30 to give accurately linear movement of the support, especially in the presence of external forces. Similarly, it can be shown that if the support 230 is to move with good precision about the Y axis, without drifting off this axis, then the angle through which the intermediate support 232 moves, shown as $\Theta B$ in FIG. 21, should be one half of the angle $\Theta A$ through which the support 230 and the attached block 229 moves. As with the mechanism of FIGS. 3 and 4, this movement is controlled by a control means 242. Here, the control means includes two parallel rigid beams 244, both shown in FIGS. 22 and 23, which beams are connected to the first support 234, the intermediate support 232, and the movable support 230, by a series of flexures 246, 248, and 250 respectively, which each attach to the supports 230, 232 and 234 at points which lie along a line which is preferably radial to the Y axis as shown. However, here the proportions of the beams 244 between these flexures, unlike for FIGS. 3 and 4, is uneven, to take into account the shorter radius of movement of the support 230 compared to that of the intermediate support. The formula for the correct amount of movement for desired the condition of $\Theta A = 2\Theta B$ is:

$$\frac{A}{B} = \frac{C}{2(C+A-B)}$$

where A, B, and C are the distances illustrated in FIG. 20.

It may be noted that although, in the drawings, the block 229 and support 230 are shown as connected by a narrow part which passes through the intermediate support 232, they could be connected by a part passing around the support 232. Also, instead of parallel beams 244, a single wide beam could be used. Furthermore, it is not necessary for the adjacent surfaces of support 234 and block 229 to be curved.

G. Magnet Arrangements for Angular Adjustment Stages

FIGS. 20 to 25 also illustrate the use of magnetic means which, as with the linear movement stage illustrated in FIGS. 3 to 5, have the effect of reducing the forces which need to be applied to the movable support 230 in order to bend the flexures 236, 238, 246, 248 and 250.

A simple arrangement of magnetic means is shown in FIGS. 20 to 23. Here, permanent magnets 262 and 264 are arranged respectively in recesses in the curved inner surface 234a of the first support 234 and in the curved outer surface 229a of the block 229. These curved surfaces are close together, for example spaced at about 2 mm., and both have cylindrical curvature based on the Y axis. The magnets 262 and 264 are arranged so that like poles are directly opposite each other when the block 229, and the associated movable support 220, are in the central, initial position shown in FIGS. 20 and 22, which is the position of minimum stress in all the flexures. As the movable support 230 and block 229 are moved from this initial position to a position such as that of FIGS. 21 and 23, the repelling magnets generate an increasing off-axis force component. As with the arrangement described with reference to FIGS. 3 and 4, the magnets may be chosen so as to be operative over a range where the forces between them are roughly linear with respect to displacement, and may be arranged to counteract most or all of the restoring forces provided by the flexures; for example about 90% of the restoring forces may be counteracted.

Figure 24:
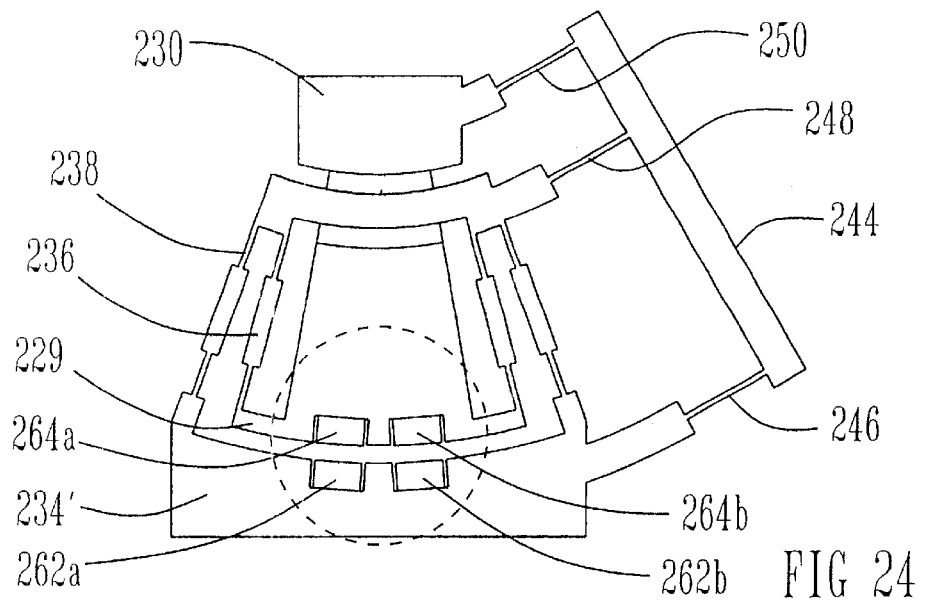
FIG. 24 shows a view similar to FIG. 20 of a modified stage with different magnetic means.
Figure 24A:
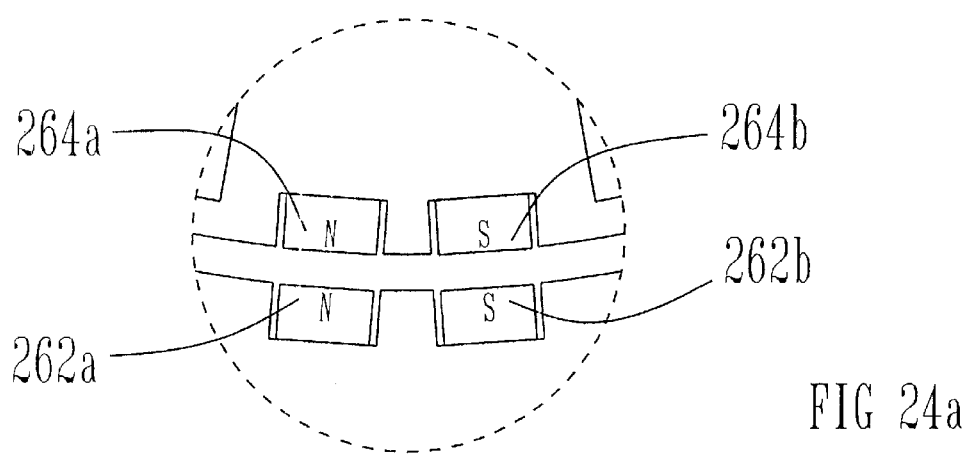
FIGS. 24a and 24b show partial views of the stage shown in FIG. 24 in different positions.
Figure 24B:
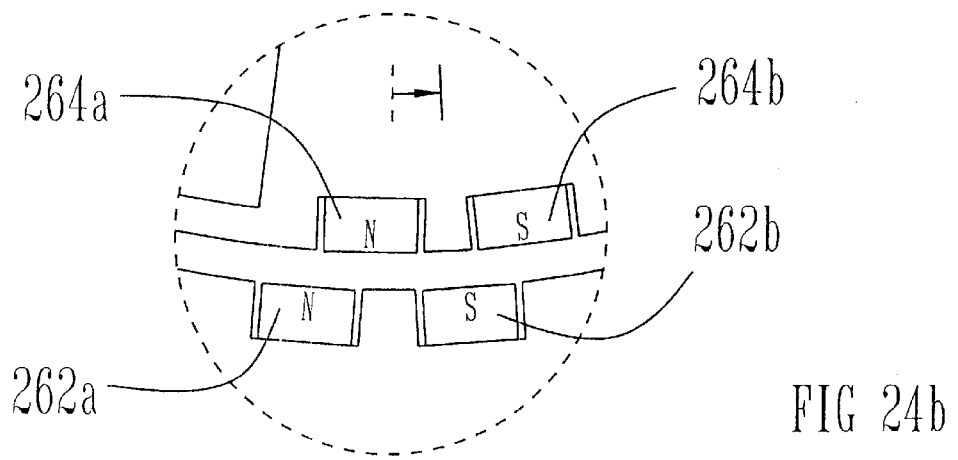

FIGS. 24, 24a and 24b show another arrangement using permanent magnets with poles which are directly opposite each other when the movable support is in its initial position, shown in FIGS. 24 and 24a, and where two pairs of magnets are used. The magnets are arranged so that in the initial position the magnets 262a and 264a of one pair have opposed north poles, and the magnets 262b and 264b of the other pair have opposed south poles. As the movable support moves from its initial position the like repelling poles of the magnets generate an increasing off-axis force, as before, and, in addition, the north pole of magnet 264a becomes attracted to the south pole of magnet 262b, adding to the forces which counteract the spring forces of the flexures.

Additional pairs of magnets may be used to give increased forces or forces with more desirable characteristics. For example, three pairs of magnets may be used, the pairs of magnets including a central pair having opposed poles of a first polarity and which lie directly opposite each other when the movable support 230 is in its initial position, and two outer pairs of magnets having opposed poles of a second polarity which also lie opposite to each other when the movable support is in its initial position, the magnets being positioned so that a magnet of the central pair is attracted to a magnet of an outer pair on movement of the movable support from its initial position.

Figure 25:
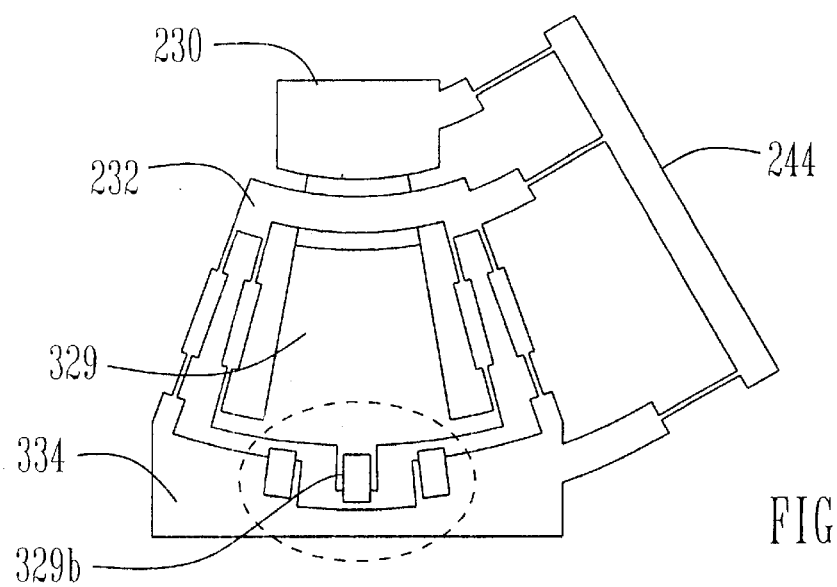
FIG. 25 shows a view similar to FIG. 24 of a further modified stage.
Figure 25A:
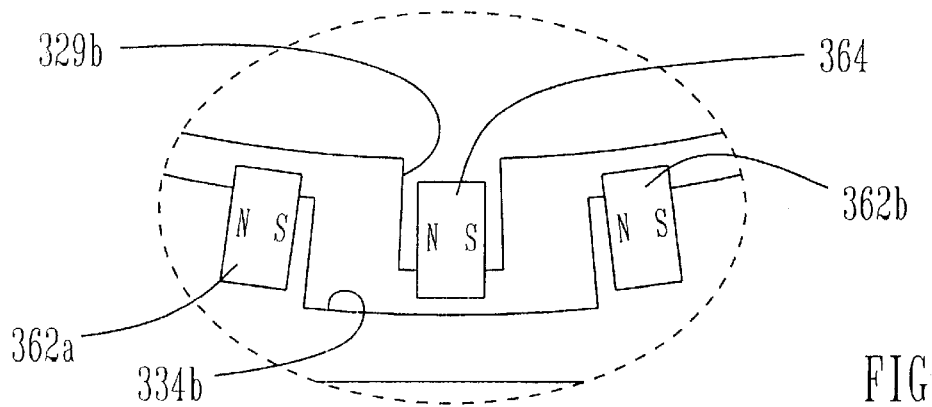
FIGS. 25a and 25b show partial views of the stage shown in FIG. 25 in different positions.
Figure 25B:
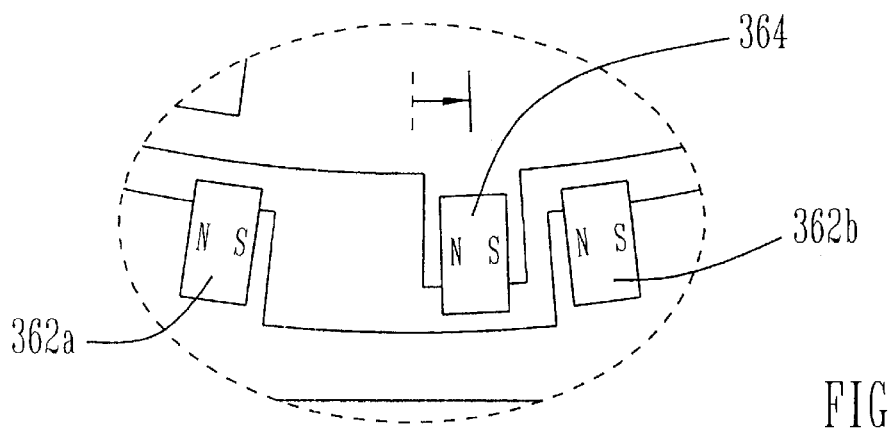

The use of magnets with opposed repulsive poles is convenient since these can be placed in small recesses in the support 234 and block 229, and require little fixing since most of the force applied tend to push the magnets into the recesses. However, magnets can be used which rely primarily on the attractive forces between magnets, and such an arrangement is shown in FIGS. 25 to 25b. Here a projecting part 329b of the block 329 is movable within a recess 334b formed in the support 334. The part 329b carries a permanent magnet 364 having a north pole on one side and a south pole on the other. The north pole of magnet 364 is attracted to the south pole of a magnet 362a set in one end of the recess 234b, and the south pole of the magnet 364 is attracted to the north pole of magnet 362b. In the initial position of FIG. 25a the forces are balanced. FIG. 25b shows the condition when the movable support has been displaced, in which there is a strong attractive force between the magnets 364 and 362b. The arrangement is such that even in the most extreme position the magnets do not actually come into contact with each other.

We claim:

1. A positioning device including:
   a first support;
   a movable support adapted for movement relative to said first support with one degree of freedom and carrying holding means for an object to be positioned;
   an intermediate support which is connected to said first support by a pair of first spaced flexible elements of substantially equal length and which is connected to the movable support by a pair of second spaced flexible elements, said second flexible elements also being substantially equal in length to each other, said first and second flexible elements being oppositely arranged and being dimensioned so that arc-errors in the movement of the intermediate support caused by bending of said first flexible elements are substantially compensated by arc movements of said second flexible elements to produce a desired movement of the movable support;

an actuator connected to cause movement of the movable support relative to the first support with bending of all said flexible elements; and control means connecting said first support, said intermediate support and the movable support so that the degree of movement of the intermediate support is one half the movement of the movable support.

2. A positioning device according to claim 1, wherein said control means is a rigid member connected by further flexible elements to said first support, said intermediate support, and said movable support.

3. A positioning device according to claim 1, wherein the movement of the movable support is rectilinear, and wherein all said flexible elements are substantially of the same length and are substantially parallel to each other when the movable support is in one position within its range of movement.

4. A positioning device according to claim 3, wherein the control means is a rigid member connected to the intermediate support at a position midway between its connections to the first support and the movable support, so as to ensure that the movement of the intermediate support relative to said first support is one-half that of the movable support.

5. A positioning device according to claim 1, wherein the movement of the support is angular movement about an axis, which axis is stationary relative to said first support, and wherein all said flexible elements extend radially with respect to said axis when the movable support is in one position within its range of movement.

6. A positioning device according to claim 1, wherein there are provided magnetic means acting between said intermediate support and one of said supports and positioned so that magnetic forces between said magnetic means act to counteract resilient restoring forces provided by said flexible elements.

7. A positioning device according to claim 1, wherein there are provided magnetic means acting between the first support and the movable support and positioned so that magnetic forces between said magnetic means act to counteract resilient restoring forces provided by said flexible elements.

8. A positioning device including:

a first support;

a movable support adapted for angular movement relative to said first support about an axis and carrying holding means for an object to be positioned;

an intermediate support which is connected to said first support by a pair of first spaced flexible elements of substantially equal length and which is connected to the movable support by a pair of second spaced flexible elements, said second pair also being substantially equal in length to each other, all of said flexible elements being radially oriented relative to said axis, said first and second flexible elements being oppositely arranged and being dimensioned so that deviations from said axis of the angular movement of the intermediate support caused by bending of said first flexible elements are substantially compensated by movements of said second flexible elements to produce angular movement of the movable support centered on said axis;

an actuator connected to cause movement of the movable support relative to the first support with bending of said flexible elements; and control means connecting said first support, said intermediate support and the movable support so that the degree of movement of the intermediate support is one half the movement of the movable support.

9. A positioning device according to claim 8, wherein the first and second flexible elements all have the same length and have inner ends at a first radius and outer ends at a second radius.

10. A positioning device according to claim 8, wherein said control means is a rigid member connected to said intermediate support at a position chosen such that the angular movement of said intermediate support relative to said first support is one half that of the movable support.

11. A positioning device according to claim 10, wherein said rigid member is connected to the first support, the intermediate support, and the movable support by flexible elements which connect onto said supports along a line which is radial relative to said axis.

12. A positioning device including:

a first support;

a second support movably mounted on said first support and constrained to move relative thereto with one degree of freedom, said second support carrying holding means for an object to be positioned;

at least one pair of resilient flexible elements connecting said first and second supports and capable of flexing in response to movements of the second support relative to the first support and which provide a restoring force when displaced from an initial position at which the restoring force is a minimum, wherein there are provided magnetic means acting between said supports, said magnetic means being positioned to counteract said restoring force when the second support is moved from said initial position, whereby the force required to move the second support against said restoring force is reduced by magnetic forces produced by said magnetic means.

13. A device according to claim 12, wherein said magnetic means include magnets having axes aligned obliquely to a direction of relative movement between the first support and the second support, said magnets being arranged so that the amount of relative movement between said latter parts may be greater than the maximum gap between said magnets.

14. A device according to claim 13, wherein said magnets are provided symmetrically about an axis which is parallel to said direction of movement of said second support, so that the net forces provided by the magnets are solely in the direction of said movement.

15. A device according to claim 14, wherein said magnets are also arranged symmetrically about an axis which is perpendicular to said direction of movement, said magnets being all aligned with sides of a rhombus.

16. A device according to claim 12, wherein, at maximum deflection of said second support relative to said first support, the magnetic forces are between 70% and 130% of the said restoring force.

17. A device according to claim 12, wherein said magnetic means includes magnets located respectively on said first and second supports and positioned so that like poles of said magnets lie directly opposite to each other when the second support is in said initial position.

18. A device according to claim 17, wherein said magnetic means includes two pairs of magnets, one magnet of each pair being on said first support and the other magnet of each pair being on the second support, said magnets being positioned so that in said initial position of the second support one of said pairs has opposed north poles and the other of said pairs has opposed south poles, the two pairs being close enough that when the said second support has been displaced from its initial position the north pole of one magnet on the said first support may be attracted to the south pole of a magnet on the second support.

19. A positioning device including:
   a first support,
   a second support connected to said first support by means allowing lateral movement of said second support relative to the first support in the direction of an X axis,
   a third support mounted for angular movement on said second support about a pivot axis,
   actuating means for causing angular movement of the third support relative to said second support about said pivot axis, said actuating means including an axially movable control link extending in a direction generally perpendicular to said X axis and having an inner end arranged to be moved axially relative to the first support by an actuator mounted on said first support, said control link being flexibly connected at its inner and outer ends respectively to said first and second supports, said control link having its outer end connected to a control mechanism mounted on said second support, said control mechanism including:
   a) restraining means for causing said outer end of the control link to move laterally with said second support in the direction of said X axis while allowing said outer end to move axially relative to said second support, and
   b) motion conversion means for converting axial movement of said control link relative to said second support into movement of a moment arm part of said third support so as to cause angular movement of said third support relative to the second support,
   the control mechanism being such that if lateral movement of the second support relative to the first support occurs in said X axis direction without axial movement of the inner end of the control link relative to the first support, the moment arm part remains substantially stationary relative to the second support.

20. A positioning device according to claim 19, wherein said first and second supports are connected by parallel linkages so that movements of points on said second support relative to the first support in said X direction occur in arcs having equal radii determined by the effective length of said flexible elements, and wherein said control link has an effective length equal to the effective lengths of said flexible elements so that the control link swings in unison with the flexible elements.

21. A positioning device according to claim 19, wherein said motion conversion means includes a bell crank having an inner end connected to said outer end of the control link and having an outer end of the bell crank arranged to transmit force to said moment arm part.

22. A positioning device according to claim 21, wherein the bell crank is pivotally mounted on said second support.

23. A positioning device according to claim 21, wherein said bell crank has a first arm connected both to said outer end of the control link and to a second link also connected to the first support, with the control and second links forming a parallelogram linkage, and wherein a second arm of the bell crank is connected to the second support by third and fourth links forming a further parallelogram linkage arranged perpendicular to the first linkage, whereby the rotational position of the bell crank relative to the second support is isolated from movements of said second support relative to the first support both in said X direction and in directions off-set from said X direction.

24. A positioning device according to claim 19, wherein said inner end of the control link is held by a lever member located at one end by fulcrum means and at its other end by actuating means.

25. A positioning device according to claim 24, wherein said fulcrum means includes an adjuster arranged to provide movement of the lever independent of the movement of the actuator.

26. A positioning device including:
   a first support,
   a second support connected to said first support by a pair of spaced, generally parallel and planar flexible elements providing a parallelogram type linkage allowing said second support to move laterally relative to the first support in a direction perpendicular to planes of said flexible elements, and whereby points on said second support are constrained to move with a swinging motion about arcs having equal radii determined by effective lengths of the flexible elements,
   a third support mounted for angular movement on said second support about a pivot axis,
   actuating means for causing angular movement of the third support relative to said second support about said pivot axis, said actuating means including an axially movable control link extending in a direction generally parallel to said flexible elements and having an inner end arranged to be moved axially relative to the first support by an actuator mounted on said first support, said link having an outer end connected to a control mechanism mounted on said second support, said control mechanism including:
   a) restraining means for causing said outer end of the control link to move laterally with said second support while allowing said outer end to move axially relative to said second support, and
   b) motion conversion means for converting axial movement of said link relative to said second support into movement of a moment arm part of said third support relative to the second support,
   wherein said link has an effective length equivalent to said effective lengths of said flexible elements, so that said link swings in unison with said flexible elements when the second support moves laterally relative to the first support,
   whereby, if movement of the second support relative to the first support occurs without axial movement of the inner end of the control member relative to the first support, the outer end of the control member remains substantially stationary relative to the second support.

27. A positioning device according to claim 26, wherein said control link outer end acts on one end of a bell crank member having a fulcrum movable with said second support, the bell crank member having a second end connected to act on said moment arm part of the third support such that movement of the bell crank member causes angular movement of the third support.

28. A positioning device according to claim 26, wherein said control member has an extension beyond said outer end which acts directly on a moment arm part of said third support along an axial direction which is off-set from said pivot axis so that axial movement of the control member causes angular movement of the third support.

29. A positioning device according to claim 28, wherein said restraining means includes a parallelogram linkage including two flexures each having an inner end fixed to the second support and having outer ends connected to a control member having its inner end connected to said outer end of the control link.

30. A positioning device including:
   a first support,
   a second support connected to said first support by linkage means allowing said second support to move laterally in translational manner both in an X axis direction and in directions off-set from said X axis direction,
   a third support mounted for angular movement on said second support about a pivot axis,
   actuating means for causing angular movement of the third support relative to said second support about said pivot axis, said actuating means including an axially movable control link extending in a direction generally perpendicular to said X direction and having an inner end arranged to be moved axially relative to the first support by an actuator mounted on said first support, said control link having an outer end connected to a control mechanism mounted at least partially on said second support, said control mechanism including:
   a) restraining means for causing said outer end of the control link to move laterally with said second support while allowing said outer end to move axially relative to said second support, and
   b) motion conversion means for converting axial movement of said control link relative to said second support into movement of a moment arm part of said third support relative to the second support,
   wherein said link is part of a parallelogram linkage including a second link parallel to said control link, said second link having an inner end connected to said first support, said parallelogram linkage including a first arm of a bell crank member which arm joins outer ends of said control and second links,
   and wherein said bell crank member has a second arm perpendicular to said first arm which second arm is connected to said second support by a further parallelogram linkage which acts perpendicularly to said first linkage, said second linkage also including a link connected to said moment arm part,
   whereby said bell crank member provides both said restraining means by the connection of said outer end of the control link to said first arm of said bell crank member, and also acts to convert axial movement of the control link relative to said first support into pivotal movement of the bell crank member and consequent movement of said moment arm and angular movement of said third support about said pivot axis,
   and whereby pivot movement of the crank member is isolated from movements of the second support relative to the first support both in said X direction and in directions off-set from said latter direction.

* * * * *